United States Patent
Sargent et al.

(10) Patent No.: US 11,268,199 B2
(45) Date of Patent: Mar. 8, 2022

(54) CORE/SHELL-VACANCY ENGINEERING (CSVE) OF CATALYSTS FOR ELECTROCHEMICAL $CO_2$ REDUCTION

(71) Applicants: TOTAL SE, Courbevoie (FR); The Governing Council of the University of Toronto, Toronto (CA)

(72) Inventors: Edward Sargent, Toronto (CA); Tao-Tao Zhuang, Toronto (CA); Zhi-Qin Liang, Toronto (CA); Alexander Ip, Toronto (CA)

(73) Assignees: TOTAL SE, Courbevoie (FR); THE GOVERNING COUNCIL OF THE UNIVERSITY OF TORONTO, Toronto (CA)

(*) Notice: Subject to any disclaimer, the term of this patent is extended or adjusted under 35 U.S.C. 154(b) by 0 days.

(21) Appl. No.: 17/052,075

(22) PCT Filed: May 8, 2019

(86) PCT No.: PCT/EP2019/061854
§ 371 (c)(1),
(2) Date: Oct. 30, 2020

(87) PCT Pub. No.: WO2019/215247
PCT Pub. Date: Nov. 14, 2019

(65) Prior Publication Data
US 2021/0238759 A1    Aug. 5, 2021

Related U.S. Application Data

(60) Provisional application No. 62/670,278, filed on May 11, 2018.

(51) Int. Cl.
*C25B 11/091* (2021.01)
*C25B 3/26* (2021.01)

(52) U.S. Cl.
CPC ............ *C25B 11/091* (2021.01); *C25B 3/26* (2021.01)

(58) Field of Classification Search
None
See application file for complete search history.

(56) References Cited

U.S. PATENT DOCUMENTS

2018/0117577 A1    5/2018    Nagpal et al.

FOREIGN PATENT DOCUMENTS

CN    107376851 A    11/2017

OTHER PUBLICATIONS

Elimelech et al., Angew. Chem. Int. Ed. 2017, 56, 10335-10340 (Year: 2017).*

(Continued)

*Primary Examiner* — Wojciech Haske
(74) *Attorney, Agent, or Firm* — Locklar PLLC

(57) ABSTRACT

The invention relates to a catalyst system for electrocatalyzing conversion of $CO_2$ into multi-carbon hydrocarbons and/or alcohols, and to the method to produce it. The catalyst comprises a core-shell structure comprising a core that is composed of metal sulphide and a shell that is composed of a metal with vacancies.

20 Claims, 10 Drawing Sheets

(56) References Cited

OTHER PUBLICATIONS

Tao-Tao Zhuang et al, "Steering post-C—C coupling selectivity enables high efficiency electroreduction of carbon dioxide to multi-carbon alcohols", Nature Catalysis, (Jun. 1, 2018), vol. 1, No. 6, pp. 421-428.

Shaodong Sun et al., "Diversified copper sulfide (Cu 2-x S) micro-/nanostructures: a comprehensive review on synthesis, modifications and applications", Nanoscale, United Kingdom, (Jan. 1, 2017), vol. 9, No. 32, p. 11357-11404.

Zhuang et al., "Cu1.945 nanocrystal seed mediated solution-phase growth of unique Cu2S—PbS heteronanostructuresw"; Chem. Commun., (20120000), vol. 48, pp. 9762-9764.

Yang, H.-P.; Yue, Y.-N.; Qin, S.; Wang, H.; Lu, J.-X., "Selective electrochemical reduction of CO2 to different alcohol products by an organically doped alloy catalyst", Green Chem , (20160000), vol. 18, pp. 3216-3220.

Ren, D. et al., "Selective electrochemical reduction of carbon dioxide to ethylene and ethanol on copper (I) oxide catalysts", ACS Catal., (20150000), vol. 5, pp. 2814-2821.

Li, C.W.; Kanan, M.W., "CO2 Reduction at Low Overpotential on Cu Electrodes Resulting from the Reduction of Thief Cu2O Films", J. Am. Chem. Soc., (20120000), vol. 134, pp. 7231-7234.

Loiudice, A. et al., "Tailoring Copper Nanocrystals towards C2 Products in Electrochemical CO2 Reduction", Angew. Them. Int. Ed., (20160000), vol. 55, pp. 5789-5792.

Handoko, A.D. et al., "Mechanistic Insights into the Selective Electroreduction of Carbon Dioxide to Ethylene on Cu2O-Derived Copper Catalysts", J Phy. Chem. C, (20160000), vol. 120, p. 20058-20067.

Ren, D.; Wong, N.T.; Handoko, A.D.; Huang, Y.; Yeo, B.S., "Mechanistic Insights into the Enhanced Activity and Stability of Agglomerated Cu Nanocrystals for the Electrochemical Reduction of Carbon Dioxide to n-Propanol", J. Phys. Chem. Lett., (20160000), vol. 7, pp. 20-24.

Ren, D.; Ang, B.S.-H.; Yeo, B.S., "Tuning the Selectivity of Carbon Dioxide Electroreduction toward Ethanol on Oxide-Derived CuXZn Catalysts", ACS Catal., (20160000), vol. 6, pp. 8239-8247.

Kim, D.; Kley, C.S.; Li, Y.; Yang, P., "Copper nanoparticle ensembles for selective electroreduction of CO2 to C2—C3 products", PNAS, (20170000), vol. 114, p. 10560-10565.

Hahn, C. et al., "Engineering Cu surfaces for the electrocatalytic conversion of CO2 : Controlling selectivity toward oxygenates and hydrocarbons", PNAS, (20170000), vol. 114, pp. 5918-5923.

Ma, S. et al., "One-step electrosynthesis of ethylene and ethanol from CO2 in an alkaline electrolyzer", J. Power Sources, (20160000), vol. 301, pp. 219-228.

Hoang, T.T.H.; Ma, S.; Gold, J.I.; Kenis, P.J.A.; Gewirth, A.A., "Nanoporous Copper Films by Additive-Controlled Electrodeposition: CO2 Reduction Catalysis", ACS Catal., (20170000), vol. 7, 25 pages.

International Search Report issued in Application No. PCT/EP2019/061854, dated Aug. 22, 2019; 4 pages.

International Preliminary Report on Patentability issued in Application No. PCT/EP2019/061854, dated Jul. 31, 2020; 15 pages.

Kortlever, R., et al., "Catalysts and Reaction Pathways for the Electrochemical Reduction of Carbon Dioxide"; J. Phys. Chem. Lett. 6, 4073-4082 (2015).

Calle-Vallejo, F. & Koper, M. "Theoretical Considerations on the Electroreduction of CO to C2 Species on Cu(100) Electrodes"; Angew. Chem. Int. Ed. 52, 7282-7285 (2013).

Peterson, A.A. et al., "How copper catalyzes the electroreduction of carbon dioxide into hydrocarbon fuels"; Energy Environ. Sci. 3, 1311-1315 (2010).

Database WPI, Derwent World Patents Index, vol. 2017, No. 83, Database accession No. 2017-81855K, XP002793464 & CN107376851 A Nov. 24, 2017 (Univ China Three Gorges) 2 pages.

\* cited by examiner

CORE/SHELL-VACANCY ENGINEERING (CSVE) OF CATALYSTS FOR ELECTROCHEMICAL $CO_2$ REDUCTION

CROSS-REFERENCE TO RELATED APPLICATIONS

This application claims the benefit of PCT/EP2019/061854 filed May 8, 2019, which claims priority from U.S. 62/670,278 filed May 11, 2018, which are incorporated herein by reference in their entireties for all purposes.

TECHNICAL FIELD

The technical field generally relates to catalytic methods for $CO_2$ reduction, and more particularly to electrocatalysts having a core-shell structure and associated methods for electrochemical $CO_2$ reduction.

BACKGROUND

The efficient electrochemical conversion of carbon dioxide ($CO_2$) into valuable carbon-based fuels and compounds is desirable and a technology that enhances such a conversion can, for example, enable the storage of intermittent renewable electricity as well as net reductions of greenhouse gas emissions. Existing catalyst systems for such $CO_2$ reduction processes have a number of drawbacks, including low selectivity for producing certain compounds.

There is a need for improved techniques and catalyst systems for efficient electrochemical $CO_2$ reduction and related methods and systems of producing chemical compounds.

SUMMARY OF THE INVENTION

A unique catalyst system for electrocatalyzing conversion of $CO_2$ into multi-carbon alcohols or other hydrocarbons is disclosed herein. In some implementations, the catalyst system can have a core-shell structure, with a core that includes metal sulphide (preferably copper sulphide) material, and a shell enveloping the core and comprising a metal (preferably copper) material with vacancies. The catalyst system can include nanoparticles having the core-shell structure and can be made in situ by deploying a catalyst precursor that is made of vacancy enriched metal sulphide particles having an external layer that is reduceable in situ to form reduced metallic shells with enriched vacancies surrounding the corresponding metal sulphide cores. One advantageous feature of the catalyst systems is a notably enhanced selectivity to multi-carbon alcohol production from $CO_2$. A number of systems, methods, catalyst systems, and various implementations and optional features thereof, are disclosed herein.

According to a first aspect, the invention provides a catalyst system for electrocatalyzing conversion of $CO_2$ into multi-carbon hydrocarbons and/or alcohols, comprising a core-shell structure comprising a core that is composed of a metal sulphide and a shell that is composed of a metal with vacancies.

The catalyst system of the invention can also be defined as follows: a catalyst system for electrocatalyzing conversion of $CO_2$ into multi-carbon hydrocarbons, comprising: a core that includes a copper catalytic material; and a shell enveloping the core and comprising a copper material with copper vacancies.

The catalyst system of the invention can also be defined as follows: a catalyst system for electrocatalyzing conversion of $CO_2$ into multi-carbon alcohols, comprising: a core that includes a copper sulphide material; and a shell enveloping the core and comprising a copper material with copper vacancies.

The catalyst system of the invention can also be defined as follows: a catalyst system for electrocatalyzing conversion of $CO_2$ into multi-carbon hydrocarbons, comprising: a core that includes a copper sulphide material; and a shell enveloping the core and comprising a copper material depleted in sulphur.

Surprisingly, it has been found by the inventors that a catalyst system comprising core-shell particles wherein the core comprises sulphur atoms and the shell comprises intentional vacancies is able to block the reaction pathway for ethylene. Thus, the catalyst system of the invention allows the ratio of alcohol-to-ethylene to be increased by over 6 times compared to relative bare-copper nanoparticles, highlighting a new approach to electro-chemically produce alcohols instead of alkenes. In addition, C2+ alcohol production rate of 126 mA cm$^{-2}$ was achieved with a selectivity of 32% Faradaic efficiency (FE). This represents a 1.6 times enhancement over the highest previously-reported current density for multi-carbon alcohols. Steering $CO_2$ reduction post-C—C coupling across such a wide range of production rates demonstrates the robustness of the invention and brings alcohol production into a more commercially relevant regime.

In a preferred embodiment, the core-shell structure is core-shell particles. The definition of the catalyst system reads: a catalyst system for electrocatalyzing conversion of $CO_2$ into multi-carbon hydrocarbons and/or alcohols, comprising core-shell particles comprising a core that is composed of a metal sulphide and a shell that is composed of a metal with vacancies.

With preference, one or more of the following features may be used with preference to further define the core-shell particles:

The core-shell particles are core-shell nanoparticles, with preference the nanoparticles have a spherical shape.

The core-shell particles are core-shell nanoparticles and the nanoparticles have an average diameter ranging between 1 nm and 30 nm as determined by transmission electron microscopy (TEM), preferably between 2 nm and 20 nm, more preferably between 3 nm and 15 nm, even more preferably between 4 nm and 12 nm, and most preferably between 5 and 10 nm.

In a variant of the invention, the core-shell structure is a layered material. The definition of the catalyst system reads: a catalyst system for electrocatalyzing conversion of $CO_2$ into multi-carbon hydrocarbons, comprising: an outer layer comprising a metal material with vacancies and being exposable to $CO_2$, and an inner material covered by the outer layer and comprising a catalytic metal and a secondary non-metal compound; with preference, the inner material is a metal sulphide.

With preference:

the outer layer comprises or consists of copper with vacancies, and the inner material comprises or consists of copper sulphide; and/or the secondary non-metal compound comprises or consists of sulphur; and/or the core-shell structure is a core-shell layered material comprising an inner layer forming a core and an outer layer forming a shell.

Thus, the definition of the catalyst may read: a catalyst system for electrocatalyzing conversion of $CO_2$ into multi-carbon hydrocarbons and/or alcohols, comprising a core-shell layered material comprising an inner layer forming a core that is composed of a metal sulphide, and an outer layer forming a shell that is composed of a metal with vacancies.

Preferably, the layered material has a thickness ranging between 1 nm and 30 nm, preferably between 2 nm and 20 nm, more preferably between 3 nm and 15 nm, even more preferably between 4 nm and 12 nm, and most preferably between 5 and 10 nm. The thickness of the layered material is determined by EDS line scan measurement wherein the EDS line scan is carried out using a JEM-ARM 200F Atomic Resolution Analytical Microscope operating at an accelerating voltage of 200 kV.

Whatever the definition of the catalyst system used and whatever its structure, one or more of the following features may be used with preference to further define the catalyst system:

- The metal of the core and the metal of the shell are the same metal.
- The metal of the core and the metal of the shell are copper.
- The metal sulphide of the core is copper sulphide and the metal of the shell is copper.
- The catalyst system comprises copper and sulphur and copper and sulphur are distributed evenly throughout the core.
- The catalyst system comprises copper and sulphur and copper and sulphur are present in a non-stoichiometric ratio.
- The core of the core-shell particles comprises or consists of a djurleite phase.
- The core of the core-shell particles has a covellite structure.
- The core and shell have an overall Cu/S molar ratio ranging between 3 and 7, preferably between 4 and 6, and more preferably between 4.5 and 5.5, as determined by XRF-1800 quantitative analysis with a 4 kW Thin-window X-ray Tube.
- The shell is formed by subjecting a vacancy enriched copper sulphide particle to reduction, thereby releasing sulphur from an external layer of the particle and forming the shell depleted in sulphur while retaining the sulphur in the core.
- The shell has a thickness that is ranging between 1 nm to 3 nm, preferably between 1.5 nm to 2.5 nm, and preferably between 1.75 nm to 2.25 nm, through EDS line scan measurement, wherein EDS line scan is carried out using a JEM-ARM 200F Atomic Resolution Analytical Microscope operating at an accelerating voltage of 200 kV.
- The core-shell particle causes modulation in branching in favour of ethanol relative to ethylene.
- The shell has a lower sulphur content than the core.
- The shell is substantially depleted in sulphur.
- The shell has a thickness that is smaller than a diameter of the core; with preference, the shell has a thickness that is between 2 to 4 times smaller than a diameter of the core, preferably between 2.5 to 3.5 times smaller than a diameter of the core, or 3 times smaller than a diameter of the core.
- The multi-carbon alcohols comprise ethanol and/or propanol.

According to a second aspect, the invention relates to a method for electrochemical production of a multi-carbon alcohol, comprising the steps of:

- contacting $CO_2$ gas and an electrolyte with an electrode comprising the catalyst system as defined in the first aspect, such that the $CO_2$ contacts a catalyst layer comprising the catalyst system;
- applying a voltage to provide a current density to cause the $CO_2$ gas contacting the catalyst layer to be electrochemically converted into the multi-carbon alcohol; and
- recovering the multi-carbon alcohol.

With preference, one or more of the following features may be used with preference to further define the method for electrochemical production of a multi-carbon alcohol:

- The current density provided in the current collection structure is predetermined for selective electrochemical conversion of the $CO_2$ into a target multi-carbon alcohol.
- The recovered multi-carbon alcohol comprises ethanol and/or propanol.
- The electrolyte comprises an alkaline potassium compound; with preference, the electrolyte comprises KOH.
- The voltage applied is ranging from 300 to 700 mV, preferably from 400 to 600 mV, and more preferably from 450 to 550 mV, at potentials of −0.95 V vs RHE.
- The method is operated to provide at least 6 times improvement in partial current density for the multi-carbon alcohol compared with those of $Cu_2S$ nanoparticles without vacancy under the same operating conditions.
- The method is operated to provide at least 19 times improvement in partial current density for the multi-carbon alcohol compared with those of pure Cu nanoparticles under the same operating conditions.
- The method is operated to provide at least 46 times improvement in partial current density for the multi-carbon alcohol compared with those of bulk $Cu_2S$ under the same operating conditions.
- The method is operated to provide at least 44 times improvement in partial current density for the multi-carbon alcohol compared with those of bulk Cu under the same operating conditions.
- The catalyst system increases the energy barrier in the ethylene pathway.

In a preferred embodiment, the method further comprises a step of deploying a catalyst system precursor comprising copper sulphide particles in the electrolyte and applying the voltage to:

- initiate the electrochemical production of the multi-carbon alcohol; and
- subject an external layer of the copper sulphide particles to reduction to remove sulphur therefrom and thereby form the shell of the catalyst system.

According to a third aspect, the invention provides the use of the catalyst system as defined in the first aspect in the electrochemical production of at least one multi-carbon alcohol.

With preference, one or more of the following features may be used with preference to further define the use of the catalyst system:

- The use is performed in a process according to the second aspect.
- The electrochemical production of the multi-carbon alcohol is performed in an alkaline electrolyte; with preference, the alkaline electrolyte comprises KOH.
- The at least one multi-carbon alcohol comprises ethanol and/or propanol.

According to a fourth aspect, the invention provides the use of the catalyst system as defined in the first aspect in the electrochemical production of at least one multi-carbon hydrocarbon; with preference, the at least one multi-carbon hydrocarbon comprises ethylene.

According to a fifth aspect, the invention provides a method of manufacturing a catalyst system comprising core-shell particles for electrocatalyzing conversion of $CO_2$ into multi-carbon hydrocarbons and/or alcohols, the method comprising the following steps:
- preparing particles that comprise vacancy enriched metal sulphide;
- subjecting the particles to reduction to produce a reduced metallic shell with enriched vacancies surrounding a metal sulphide core, thereby forming the core-shell particle.

With preference, one or more of the following features may be used with preference to further define the method of manufacturing the catalyst system of the invention:
- The catalyst system is according to the first aspect of the invention.
- The particles that are prepared are nanoparticles; with preference, the nanoparticles are colloidal nanoparticles.
- The nanoparticles that are prepared are composed of copper sulphide.
- The particles are prepared using a solvothermal method.
- The reduction of the particles comprises electroreduction by contacting the particles with $CO_2$ saturated electrolyte and applying a voltage to provide a current density to cause $CO_2$ gas contacting the particles to be electrochemically converted into the multi-carbon hydrocarbon; with preference, the electrolyte comprises an alkaline KOH electrolyte.
- The electroreduction is performed in a two-compartment electrochemical H-cell with a proton exchange membrane as a separator and a flow-cell configuration comprising a gas-diffusion layer with an anion exchange membrane.
- The electroreduction is conducted for at least 1 minute, at least 2 minutes, at least 3 minutes, at least 4 minutes, at least 5 minutes, or between 1 and 6 minutes or between 2 and 5 minutes, to form the core-shell particles.
- The electroreduction is performed in an electroreduction unit that is subsequently used to produce the multi-carbon hydrocarbons such that the core-shell particles are formed in situ.

In an embodiment, the method further comprises a step of washing the collected particles and then drying the washed particles. With preference, the washing is performed with acetone and hexane, and the drying is performed under vacuum conditions.

In a preferred embodiment, the step of preparing of the particles comprises the following sub-steps:
- dissolving $Cu_{(acac)2}$ in a solvent to form a reaction mixture;
- heating the reaction mixture to form the particles;
- collecting the particles from the reaction mixture.

With preference, one or more of the following features is true:
- the heating is performed at a temperature ranging from 230 to 250° C. for 15 to 25 minutes; and/or
- the reaction mixture is subjected to mixing during the heating step; and/or
- the collecting comprises a centrifugation step.

According to a sixth aspect, the invention provides the use of the catalyst system as defined according to the first aspect of the invention in a fuel cell.

According to a seventh aspect, the invention provides a catalyst precursor for deployment in an electrocatalysis unit for in situ formation of a catalyst system for conversion of $CO_2$ into multi-carbon hydrocarbons, the catalyst precursor comprising vacancy enriched metal sulphide nanoparticles having an external layer that is reduceable in situ to form reduced metallic shells with enriched vacancies surrounding corresponding metal sulphide cores.

With preference, one or more of the following features may be used with preference to further define the catalyst precursor of the invention:
- The vacancy enriched metal sulphide nanoparticles are formed by dissolving $Cu_{(acac)2}$ in a solvent to form a reaction mixture, heating the reaction mixture to form the nanoparticles; collecting the nanoparticles from the reaction mixture.
- The vacancy enriched metal sulphide nanoparticles have an average diameter ranging between 1 nm and 30 nm as determined by transmission electron microscopy (TEM), preferably between 2 nm and 20 nm, more preferably between 3 nm and 15 nm, even more preferably between 4 nm and 12 nm, and most preferably between 5 nm and 10 nm.
- The vacancy enriched metal sulphide nanoparticles have a generally spherical shape.
- The vacancy enriched metal sulphide nanoparticles comprise a djurleite phase.
- The vacancy enriched metal sulphide nanoparticles have a covellite structure.
- The vacancy enriched metal sulphide nanoparticles have an overall Cu/S molar ratio ranging between 1 and 3 as determined by XRF-1800 quantitative analysis with a 4 kW Thin-window X-ray Tube.
- The metal is copper.
- The metal and sulphur are distributed evenly throughout the vacancy enriched metal sulphide nanoparticles.
- The multi-carbon hydrocarbons comprise multi-carbon alcohols; with preference, the multi-carbon alcohols comprise ethanol and/or propanol.

According to an eighth aspect, the invention provides the use of the catalyst precursor as defined in the seventh aspect, in an electrocatalysis operation for conversion of $CO_2$ into multi-carbon hydrocarbons. Preferably, the multi-carbon hydrocarbons comprise multi-carbon alcohols; more preferably the multi-carbon alcohols comprise ethanol and/or propanol.

According to a ninth aspect, the invention provides a system for $CO_2$ electroreduction to produce multi-carbon hydrocarbons, comprising:
- an electrolytic cell configured to receive a liquid electrolyte and $CO_2$ gas;
- an anode; and
- a cathode comprising a catalyst system as defined in the first aspect of the invention or comprising a catalyst precursor as defined in the seventh aspect of the invention.

With preference, the electrolytic cell is configured to be operable at conditions that maximize production of multi-carbon alcohols.

According to a tenth aspect, the invention provides a method for electrochemical production of a multi-carbon hydrocarbon, comprising:
- contacting $CO_2$ gas and an electrolyte with an electrode comprising the catalyst system as defined in the first aspect of the invention, such that the $CO_2$ contacts a catalyst layer comprising the catalyst system;

applying a voltage to provide a current density to cause the $CO_2$ gas contacting the catalyst layer to be electrochemically converted into the multi-carbon hydrocarbon; and recovering the multi-carbon hydrocarbon.

In a preferred embodiment, the method further comprises providing a negative potential to promote selective electrochemical conversion of the $CO_2$ into a target multi-carbon alcohol; with preference, the negative potential is ranging from −1 to 0.9 V vs RHE, preferably ranging from −0.99 to −0.91 V vs RHE, more preferably ranging from −0.98 to −0.92 V vs RHE, even more preferably ranging from −0.97 to −0.93 V vs RHE, most preferably ranging from −0.96 to −0.94 V vs RHE, and even most preferably is −0.95 V vs RHE.

In another preferred embodiment, the method further comprises providing a negative potential to promote electrochemical conversion of the $CO_2$ into a target multi-carbon hydrocarbon. With preference, the target multi-carbon hydrocarbon is ethylene; and/or the negative potential is −1.1V vs RHE.

With preference, the negative potential that is applied is pre-determined in accordance with selective production of a target multi-carbon hydrocarbon.

In an embodiment 1, the invention provides a catalyst system for electrocatalyzing conversion of $CO_2$ into multi-carbon alcohols, comprising: a core that includes a copper sulfide material; and a shell enveloping the core and comprising a copper material with copper vacancies.

In a further embodiment 2, in the catalyst system of embodiment 1, the core and shell form a corresponding nanoparticle.

In a further embodiment 3, in the catalyst system of embodiment 2, the nanoparticles have an average diameter between 1 nm and 30 nm, 2 nm and 20 nm, 3 nm and 15 nm, 4 nm and 12 nm, or 5 and 10 nm.

In a further embodiment 4, in the catalyst system of embodiment 2 or 3, the nanoparticles have a generally spherical shape.

In a further embodiment 5, in the catalyst system of any one of embodiments 1 to 4, copper and sulfur are distributed evenly throughout the core.

In a further embodiment 6, in the catalyst system of any one of embodiments 1 to 5, copper and sulfur are present in a non-stoichiometric ratio.

In a further embodiment 7, in the catalyst system of any one of embodiments 1 to 6, wherein the core comprises or consists of a djurleite phase.

In a further embodiment 8, in the catalyst system of any one of embodiments 1 to 7, the core has a covellite structure.

In a further embodiment 9, in the catalyst system of any one of embodiments 1 to 8, the core and shell have an overall Cu/S ratio between about 3 and about 7, 4 and 6, or 4.5 and 5.5.

In a further embodiment 10, in the catalyst system of any one of embodiments 1 to 9, the shell is formed by subjecting a vacancy enriched copper sulfide particle to reduction, thereby releasing sulfur from an external layer of the particle and forming the shell depleted in sulfur while retaining the sulfur in the core.

In a further embodiment 10, in the catalyst system of any one of embodiments 1 to 10, the shell has a thickness that is about 1-3 nm, 1.5-2.5 nm, or 1.75 nm to 2.25 nm.

In a further embodiment 12, the invention provides a catalyst system for electrocatalyzing conversion of $CO_2$ into multi-carbon hydrocarbons, comprising a core-shell particle comprising a core that is composed of a metal sulfide and a shell that is composed of a metal with vacancies.

In a further embodiment 13, in the catalyst system of embodiment 12, the metal sulfide of the core is copper sulfide and the metal of the shell is copper.

In a further embodiment 14, in the catalyst system of embodiment 12 or 13, the core-shell particle is a nanoparticle.

In a further embodiment 15, in the catalyst system of embodiment 14, the nanoparticles have an average size between 1 nm and 30 nm, 2 nm and 20 nm, 3 nm and 15 nm, 4 nm and 12 nm, or 5 and 10 nm.

In a further embodiment 16, in the catalyst system of embodiment 14 or 15, the nanoparticles have a generally spherical shape.

In a further embodiment 17, in the catalyst system of any one of embodiments 12 to 16, the metal and sulfur are distributed evenly throughout the core.

In a further embodiment 18, in the catalyst system of any one of embodiments 12 to 17, the metal and sulfur are present in a non-stoichiometric ratio.

In a further embodiment 19, in the catalyst system of any one of embodiments 12 to 18, the core comprises or consists of a djurleite phase.

In a further embodiment 20, in the catalyst system of any one of embodiments 12 to 19, the core has a covellite structure.

In a further embodiment 21, in the catalyst system of any one of embodiments 12 to 20, the core-shell particle has an overall metal/S ratio between about 3 and about 7, 4 and 6, or 4.5 and 5.5.

In a further embodiment 22, in the catalyst system of any one of embodiments 12 to 21, the shell is formed by subjecting a vacancy enriched metal sulfide particle to reduction, thereby releasing sulfur from an external layer of the particle and forming the shell depleted in sulfur while retaining the sulfur in the core.

In a further embodiment 23, in the catalyst system of any one of embodiments 12 to 22, the shell has a thickness that is about 1-3 nm, 1.5-2.5 nm, or 1.75 nm to 2.25 nm.

In a further embodiment 24, in the catalyst system of any one of embodiments 12 to 23, the metal of the core and the metal of the shell are the same metal.

In a further embodiment 25, in the catalyst system of any one of embodiments 12 to 23, the metal of the core and the metal of the shell are copper.

In a further embodiment 26, in the catalyst system of any one of embodiments 12 to 25, the core-shell particle causes modulation in branching in favour of ethanol relative to ethylene.

In a further embodiment 27, in the catalyst system of any one of embodiments 12 to 26, the shell has a lower sulfur content than the core.

In a further embodiment 28, in the catalyst system of any one of embodiments 12 to 26, the shell is substantially depleted in sulfur.

In a further embodiment 29, in the catalyst system of any one of embodiments 12 to 28, the shell has a thickness that is smaller than a diameter of the core.

In a further embodiment 30, in the catalyst system of any one of embodiments 12 to 28, the shell has a thickness that is between 2-4 times, 2.5-3.5 times, or 3 times smaller than a diameter of the core.

In a further embodiment 31, the invention provides a catalyst system for electrocatalyzing conversion of $CO_2$ into multi-carbon hydrocarbons, comprising: a core that includes a copper catalytic material; and a shell enveloping the core and comprising a copper material with copper vacancies.

In a further embodiment 32, the catalyst system of embodiment 31 further comprises at least one feature from any one of embodiments 1 to 30.

In a further embodiment 33, the invention provides a catalyst system for electrocatalyzing conversion of $CO_2$ into multi-carbon hydrocarbons, comprising: a core that includes a copper sulfide material; and a shell enveloping the core and comprising a copper material depleted in sulfur.

In a further embodiment 34, in the catalyst system of embodiment 33 further comprises at least one feature from any one of embodiments 1 to 30.

In a further embodiment 35, the catalyst system of any one of embodiments 12 to 34, is for electrocatalyzing conversion of $CO_2$ into multi-carbon alcohols.

In a further embodiment 36, in the catalyst system of embodiment 35, the multi-carbon alcohols comprise ethanol.

In a further embodiment 37, in the catalyst system of embodiment 35 or 36, the multi-carbon alcohols comprise propanol.

In a further embodiment 38, the invention provides a method for electrochemical production of a multi-carbon alcohol, comprising:
  contacting $CO_2$ gas and an electrolyte with an electrode comprising the catalyst system as defined in any one of embodiments 1 to 37, such that the $CO_2$ contacts a catalyst layer comprising the catalyst system;
  applying a voltage to provide a current density to cause the $CO_2$ gas contacting the catalyst layer to be electrochemically converted into the multi-carbon alcohol; and recovering the multi-carbon alcohol.

In a further embodiment 39, in the method of embodiment 38, the current density provided in the current collection structure is predetermined for selective electrochemical conversion of the $CO_2$ into a target multi-carbon alcohol.

In a further embodiment 40, in the method of embodiment 39, the target multi-carbon alcohol is ethanol and/or propanol.

In a further embodiment 41, in the method of any one of embodiments 38 to 40, the electrolyte comprises an alkaline potassium compound.

In a further embodiment 42, in the method of any one of embodiments 38 to 41, the electrolyte comprises KOH.

In a further embodiment 43, the method of any one of embodiments 38 to 42, comprises:
  deploying a catalyst system precursor comprising copper sulfide particles in the electrolyte and applying the voltage to:
    initiate the electrochemical production of the multi-carbon alcohol; and
    subject an external layer of the copper sulfide particles to reduction to remove sulfur therefrom and thereby form the shell of the catalyst system.

In a further embodiment 44, in the method of any one of embodiments 38 to 43, the voltage applied is about 300-700 mV, 400-600 mV, or 450-550 mV, at potentials of −0.95 V vs RHE.

In a further embodiment 45, the method of any one of embodiments 38 to 44, is operated to provide at least 6 times improvement in partial current density for the multi-carbon alcohol compared with those of $Cu_2S$ nanoparticles without vacancy under the same operating conditions.

In a further embodiment 46, the method of any one of embodiments 38 to 44, is operated to provide at least 19 times, improvement in partial current density for the multi-carbon alcohol compared with those of pure Cu nanoparticles under the same operating conditions.

In a further embodiment 47, the method of any one of embodiments 38 to 44, is operated to provide at least 46 times improvement in partial current density for the multi-carbon alcohol compared with those of bulk $Cu_2S$ under the same operating conditions.

In a further embodiment 48, the method of any one of embodiments 38 to 44, is operated to provide at least 44 times improvement in partial current density for the multi-carbon alcohol compared with those of bulk Cu under the same operating conditions.

In a further embodiment 49, in the method of any one of embodiments 38 to 48, the catalyst system increases an energy barrier in the ethylene pathway.

In a further embodiment 50, the invention provides a use of the catalyst system as defined in any one of embodiments 1 to 37 in the electrochemical production of at least one multi-carbon alcohol.

In a further embodiment 51, the invention provides the use of embodiment 50, wherein the electrochemical production of the multi-carbon alcohol is performed in an alkaline electrolyte.

In a further embodiment 52, the invention provides the use of embodiment 50 or 51, wherein the at least one multi-carbon alcohol comprises ethanol.

In a further embodiment 53, the invention provides the use of embodiment any one of embodiments 50 to 52, wherein the at least one multi-carbon alcohol comprises propanol.

In a further embodiment 54, the invention provides the use of any one of embodiments 50 to 53, wherein the alkaline electrolyte comprises KOH.

In a further embodiment 55, the invention provides the use of the catalyst system as defined in any one of embodiments 12 to 34 in the electrochemical production of at least one multi-carbon hydrocarbon.

In a further embodiment 56, the invention provides the use of embodiment 55, wherein the at least one multi-carbon hydrocarbon comprises ethylene.

In a further embodiment 57, the invention provides a method of manufacturing a catalyst system comprising a core-shell particle for electrocatalyzing conversion of $CO_2$ into multi-carbon hydrocarbons, the method comprising:
  preparing particles that comprise vacancy enriched metal sulfide;
  subjecting the particles to reduction to produce a reduced metallic shell with enriched vacancies surrounding a metal sulfide core, thereby forming the core-shell particle.

In a further embodiment 58, in the method of embodiment 57, the particles that are prepared are nanoparticles.

In a further embodiment 59, in the method of embodiment 58, the nanoparticles that are prepared are colloidal nanoparticles.

In a further embodiment 60, in the method of embodiment 58 or 59, the nanoparticles that are prepared are composed of copper sulfide.

In a further embodiment 61, in the method of any one of embodiments 57 to 60, the particles are prepared using a solvothermal method.

In a further embodiment 62, in the method of any one of embodiments 57 to 61, the reduction of the particles comprises electroreduction by contacting the particles to with $CO_2$ saturated electrolyte and applying a voltage to provide a current density to cause $CO_2$ gas contacting the particles to be electrochemically converted into the multi-carbon hydrocarbon.

In a further embodiment 63, in the method of embodiment 62, the electrolyte comprises an alkaline KOH electrolyte.

In a further embodiment 64, in the method of any one of embodiments 57 to 63, the preparing of the particles comprises:
dissolving $Cu_{(acac)2}$ in a solvent to form a reaction mixture;
heating the reaction mixture to form the particles;
collecting the particles from the reaction mixture.

In a further embodiment 65, in the method of embodiment 64, the heating is performed at 230-250° C. for 15-25 minutes.

In a further embodiment 66, in the method of embodiment 64 or 65, the reaction mixture is subjected to mixing.

In a further embodiment 67, in the method of any one of embodiments 64 to 66, the collecting comprises centrifugation.

In a further embodiment 68, the method of any one of embodiments 64 to 67 further comprises washing the collected particles and then drying the washed particles.

In a further embodiment 69, in the method of embodiment 68, the washing is performed with acetone and hexane, and the drying is performed under vacuum conditions.

In a further embodiment 70, in the method of embodiment 62 or 63, the electroreduction is performed in a two-compartment electrochemical H-cell with a proton exchange membrane as a separator and a flow-cell configuration comprising a gas-diffusion layer with an anion exchange membrane.

In a further embodiment 71, in the method of embodiment 62, 63 or 70, the electroreduction is conducted for at least 1 minute, at least 2 minutes, at least 3 minutes, as least 4 minutes, at least 5 minutes, or between 1 and 6 minutes or between 2 and 5 minutes, to form the core-shell particles.

In a further embodiment 72, in the method of embodiment 62, 63 or 70, the electroreduction is performed in an electroreduction unit that is subsequently used to produce the multi-carbon hydrocarbons such that the core-shell particles are formed in situ.

In a further embodiment 73, in the method of any one of embodiments 57 to 72, the catalyst system has one or more features of any one of embodiments 1 to 37.

In a further embodiment 74, the invention relates to an use of the catalyst system as defined in any one of embodiments 1 to 37 in a fuel cell.

In a further embodiment 75, the invention relates to a catalyst precursor for deployment in an electrocatalysis unit for in situ formation of a catalyst system for conversion of $CO_2$ into multi-carbon hydrocarbons, the catalyst precursor comprising vacancy enriched metal sulfide nanoparticles having an external layer that is reduceable in situ to form reduced metallic shells with enriched vacancies surrounding corresponding metal sulfide cores.

In a further embodiment 76, in the catalyst precursor of embodiment 75, the vacancy enriched metal sulfide nanoparticles are formed by dissolving $Cu_{(acac)2}$ in a solvent to form a reaction mixture, heating the reaction mixture to form the nanoparticles; collecting the nanoparticles from the reaction mixture.

In a further embodiment 77, in the catalyst precursor of embodiment 76, the vacancy enriched metal sulfide nanoparticles have an average diameter between 1 nm and 30 nm, 2 nm and 20 nm, 3 nm and 15 nm, 4 nm and 12 nm, or 5 and 10 nm.

In a further embodiment 78, in the catalyst precursor of embodiment 77, the vacancy enriched metal sulfide nanoparticles have a generally spherical shape.

In a further embodiment 79, in the catalyst precursor of embodiment 77 or 78, the metal is copper.

In a further embodiment 80, in the catalyst precursor of any one of embodiments 77 to 79, the metal and sulfur are distributed evenly throughout the vacancy enriched metal sulfide nanoparticles.

In a further embodiment 81, in the catalyst precursor of any one of embodiments 77 to 80, the vacancy enriched metal sulfide nanoparticles comprise a djurleite phase.

In a further embodiment 82, in the catalyst precursor of any one of embodiments 77 to 81, the vacancy enriched metal sulfide nanoparticles have a covellite structure.

In a further embodiment 83, in the catalyst precursor of any one of embodiments 77 to 82, the vacancy enriched metal sulfide nanoparticles have an overall Cu/S ratio between about 1 and about 3.

In a further embodiment 84, in the catalyst precursor of any one of embodiments 75 to 83, the multi-carbon hydrocarbons comprise multi-carbon alcohols.

In a further embodiment 85, the invention relates to an use of the catalyst precursor as defined in any one of embodiments 75 to 84, in an electrocatalysis operation for conversion of $CO_2$ into multi-carbon hydrocarbons.

In a further embodiment 86, the invention relates to an use of embodiment 85, wherein the into multi-carbon hydrocarbons comprise multi-carbon alcohols.

In a further embodiment 87, the invention relates to a catalyst system for electrocatalyzing conversion of $CO_2$ into multi-carbon hydrocarbons, comprising: an outer layer comprising a metal material with vacancies and being exposable to $CO_2$, and an inner material covered by the outer layer and comprising a catalytic metal and a secondary non-metal compound.

In a further embodiment 88, in the catalyst system of embodiment 87, the outer layer comprises or consists of copper with vacancies, and the inner material comprises or consists of copper sulfide.

In a further embodiment 89, in the catalyst system of embodiment 87 or 88, the inner material is formed as a core and the outer layer is formed as a shell that envelops the core.

In a further embodiment 90, in the catalyst system of any one of embodiments 87 to 89, the secondary non-metal compound comprises or consists of sulfur.

In a further embodiment 91, the catalyst system of any one of embodiments 87 to 90, further comprises at least one feature from any one of embodiments 1 to 37.

In a further embodiment 92, the invention relates to a system for $CO_2$ electroreduction to produce multi-carbon hydrocarbons, comprising:
an electrolytic cell configured to receive a liquid electrolyte and $CO_2$ gas;
an anode; and
a cathode comprising a catalyst system as defined in any one of embodiments 1 to 37 or 87 to 91, or comprising a catalyst precursor of any one of embodiments 75 to 84.

In a further embodiment 93, in the system of embodiment 92, the electrolytic cell is configured to be operable at conditions to maximize production of multi-carbon alcohols.

In a further embodiment 94, the invention relates to a method for electrochemical production of a multi-carbon hydrocarbon, comprising:

contacting CO$_2$ gas and an electrolyte with an electrode comprising the catalyst system as defined in any one of embodiments 1 to 37, such that the CO$_2$ contacts a catalyst layer comprising the catalyst system;

applying a voltage to provide a current density to cause the CO$_2$ gas contacting the catalyst layer to be electrochemically converted into the multi-carbon hydrocarbon; and recovering the multi-carbon hydrocarbon.

In a further embodiment 95, the method of embodiment 94 further comprises providing a negative potential to promote selective electrochemical conversion of the CO$_2$ into a target multi-carbon alcohol.

In a further embodiment 96, in the method of embodiment 95, the negative potential is about −1 to 0.9 V vs RHE, −0.99 to −0.91 V vs RHE, −0.98 to −0.92 V vs RHE, −0.97 to −0.93 V vs RHE, −0.96 to −0.94 V vs RHE, or −0.95 V vs RHE.

In a further embodiment 97, the method of embodiment 94 further comprises providing a negative potential to promote electrochemical conversion of the CO$_2$ into a target multi-carbon hydrocarbon.

In a further embodiment 98, in the method of embodiment 97, the target multi-carbon hydrocarbon is ethylene.

In a further embodiment 99, in the method of embodiment 97 or 98, the negative potential is about −1.1V vs RHE.

In a further embodiment 100, in the method of any one of embodiments 94 to 99, the negative potential that is applied is pre-determined in accordance with selective production of a target multi-carbon hydrocarbon.

DESCRIPTION OF THE TABLES

Figure 1:
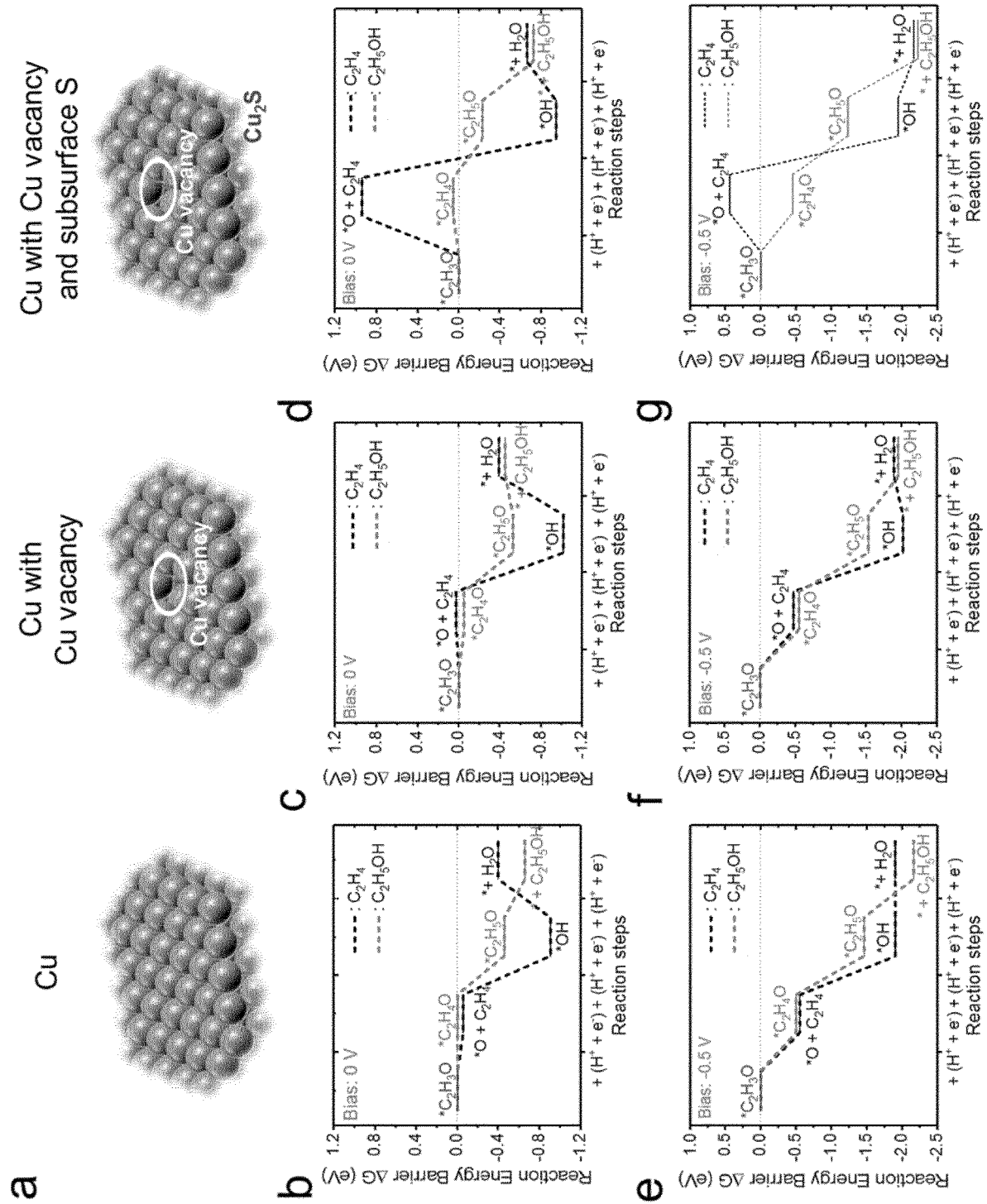
FIG. 1 illustrates reaction Gibbs free energy diagrams. (a) Atomic models. Reaction Gibbs free energy diagram from the adsorbed C$_2$H$_3$O intermediate to ethylene (black lines) and ethanol (red lines) for (b) pristine copper (Cu), (c) Cu with Cu vacancy, and (d) Cu with Cu vacancy and subsurface sulphur (S) slab models. (e-g) The same reaction free energy after applying −0.5 V bias potential.

Table 1. Comparison of CO$_2$ reduction to ethylene and ethanol using different copper-based catalysts running at different potentials in H-cell.

Table 2. Activation energy barrier (eV) at equilibrium potential (U$^0$) and at applied bias (−0.5 V) for the first hydrogenation step on different surfaces.

Table 3. Positron lifetime parameters of V—Cu2S derived CSVE nanoparticles and Cu2S bulk.

Table 4. Faradaic efficiency of carbon products at the different applied potentials using designed CSVE nanocatalyst.

Table 5. Comparison of CO$_2$ reduction to ethylene, ethanol and n-propanol using different copper-based catalysts running at −0.95 V vs RHE in H-cell.

Table 6. Faradaic efficiency of products distribution in 1M KOH electrolyte at different applied total current densities using the CSVE nanocatalyst in flow-cell system.

Table 7. Comparison of CO$_2$ reduction to multi-carbon alcohols and n-propanol (C$_3$H$_7$OH) using copper-based catalysts. For catalysts 1-9 the values measured are data in the H-cell and for catalysts 10-11 the values measured are data in the flow-cell.

DETAILED DESCRIPTION OF THE INVENTION

Techniques described herein relate to enhanced catalyst systems that can be used for electrochemical $CO_2$ reduction and the production of multi-carbon compounds.

Electrochemical reduction of $CO_2$ into value-added carbon-based products addresses the need for long-term storage of renewable electricity. Liquid multi-carbon alcohols, such as ethanol and n-propanol, are highly desired as renewable transportation fuels. They offer high energy densities, ease of long-range transport, and direct usage.

The electrochemical production of ethanol and n-propanol is complicated by a reaction pathway that involves multiple $CO_2$ molecules and fully 12 electron transfer steps. The pathway's selectivity to alcohols suffers from competition from the electroreduction to the gas-phase C2 product ethylene. Creating catalysts that manage these numerous reaction steps for selective production of liquid multi-carbon alcohols has remained an unsolved challenge.

Conventional catalysts have largely targeted C2 vs. C1 production; whereas the present invention targets productivity following the C—C coupling reaction step. In this way, the present invention aims to enhance hydrogenation of C2+ intermediates toward alcohols.

As will be explained in further detail below, the invention explored positive factors to switch $CO_2$ reduction reaction pathways from ethylene to alcohol production. Using a sequential synthesis in which colloidal nucleation was combined with electrochemical reduction, the invention engineered a new catalyst that efficiently electrochemically reduces $CO_2$ to n-propanol and ethanol.

The Catalyst System

The invention provides a catalyst system for electrocatalyzing conversion of $CO_2$ into multi-carbon hydrocarbons and/or multi-carbon alcohols, comprising a core-shell structure comprising a core that is composed of a metal sulphide and a shell that is composed of a metal with vacancies.

The multi-carbon hydrocarbons are, or preferably comprise ethylene. The multi-carbon alcohols are, or comprise, ethanol and/or propanol.

In some implementations, the catalyst system can include a core comprising a catalytic metal (e.g., copper) and a modifier (e.g., sulphur atoms), and a shell enveloping the core and comprising a catalytic metal (e.g., copper) with intentional vacancies. This synthesis strategy can be applied to other metals, such as lead, zinc, tin, et. al. However, Cu is the most promising metal for multi-carbon products over $CO_2$ reduction thanks to its moderate CO binding energy. In this invention, we focus therefore on the Cu-based catalysts, especially on the Cu metal shell because of its surface catalytic active sites. The core-bound sulphur atoms, particularly in combination with the surface Cu vacancy, increase the energy barrier of post C—C coupling towards ethylene production while leaving the ethanol pathway generally unaffected, compared to that of the pure Cu catalyst. The designed $Cu_2S/Cu$—V core/shell-vacancy catalyst provides a shift selectivity for alcohols. Advantageously, the core-shell particle of the invention causes modulation in branching in favour of ethanol relative to ethylene.

It is noted that $Cu_2O$ was also tested as the core, and it was found that $Cu_2O$ core suffers from being reduced to pure Cu over the course of $CO_2$ reduction. Thus, the sulphur-based catalyst systems as disclosed herein provide advantageous functionalities over oxygen-based systems.

In a preferred embodiment, the metal of the core and the metal of the shell are the same metal; with preference, the metal of the core and the metal of the shell are copper. Thus, in a preferred embodiment of the invention, the metal sulphide of the core is copper sulphide and the metal of the shell is copper.

As it is understood, the shell has a lower sulphur content than the core. In a preferred embodiment, the shell is substantially depleted in sulphur.

In a preferred embodiment, the catalyst comprises copper and sulphur and copper and sulphur are distributed evenly throughout the core.

To achieve the $Cu_2S/Cu$—V core/shell-vacancy structure, the V—$Cu_2S$ nanoparticles with non-stoichiometric Cu is first synthesized, and then the nanoparticle to produce the $Cu_2S/Cu$—V structure is partially reduced.

In the engineered structure, the surface metal is the active species over the electrocatalysis. The designed metal sulphide core affects the electronic properties of the surface metal and thereby the post C—C coupling intermediates and the following reaction pathway toward the production of multi-carbon alcohols over $CO_2$ reduction.

In a preferred embodiment, copper and sulphur are present in a non-stoichiometric ratio The $Cu_2S/Cu$—V core/shell vacancy catalyst is produced through partially reducing the V—$Cu_2S$ nanoparticles. The Cu and S of the V—$Cu_2S$ nanoparticles present in a non-stoichiometric ratio. After the initial electroreduction, the surface is reduced to the metallic Cu with vacancy while the core changed to stoichiometric $Cu_2S$.

The designed metal sulphide core and the surface vacancy synergistically affect the electronic properties of the surface metal and thereby the post C—C coupling intermediates and the following reaction pathway toward the production of multi-carbon alcohols over $CO_2$ reduction.

In a preferred embodiment, the core comprises, or consists of, a djurleite phase. As it is known to the person skilled in the art, for compositions near $Cu_2S$ a number of phases exist at room temperature. These may be divided into two broad categories based on the nature of the sulphur close-packing in the structure. The first category comprises chalcocite and djurleite with structures based on hexagonal close-packing of sulphur atoms. The second category comprises digenite-like structures and anilite with sulphur atoms in approximately cubic close-packing. The structure of the core as a djurleite phase can be determined by transmission electron microscopy.

In a preferred embodiment, the core has a covellite structure. The initial V—$Cu_2S$ has a djurleite phase; while the core of the final $Cu_2S/Cu$—V core/shell vacancy catalyst has a chalcocite phase.

In a preferred embodiment, the core and shell have an overall Cu/S molar ratio ranging between 3 and 7 as determined by XRF-1800 quantitative analysis with a 4 kW Thin-window X-ray Tube, preferably between 4 and 6, and more preferably between 4.5 and 5.5. Furthermore, examples of the shell-core catalyst systems described herein can include other elements besides sulphur and copper, such as oxygen and tin.

The catalyst system of the invention can have a variety of properties and features. For example, the catalyst system can take the form of a catalytic material that includes core-shell particles, with copper sulphide core and copper-with-vacancies shell. Other structures are also possible, such as a material that includes an outer copper-with-vacancies layer and an inner copper sulphide material, and thus does not necessarily have a particle structure that is the same as the shell-core particles. In addition, the catalyst system can have certain physical properties, such as the size of the core and shell, and the compositions of the core and shell.

According to some implementations disclosed herein, a catalyst system for the electroreduction of $CO_2$ into alcohols can have a core/shell structure designed to provide and leverage certain vacancy properties to the catalyst system. For example, the catalyst system can include a nanoparticle core comprising sulphur atoms and a shell comprising intentional copper vacancies, to block the reaction pathway for ethylene. This innovative core/shell-vacancy engineering (CSVE) strategy for the catalyst system generally increases the reaction barrier to ethylene without affecting the path for alcohols.

Referring to FIG. 3a, the catalyst system (which can also be referred to as the electrocatalyst, as in FIG. 3a) includes a $Cu_2S$ core and a Cu—V shell for enhanced electrocatalytic conversion of $CO_2$ into liquid alcohols.

In a preferred embodiment, the catalyst system is in the form of core-shell particles. Advantageously, the core-shell particles are nanoparticles, with preference the nanoparticles have a spherical shape.

Advantageously, the nanoparticles have an average diameter ranging from 1 nm to 30 nm as determined by transmission electron microscopy (TEM), preferably from 2 nm to 20 nm, more preferably from 3 nm to 15 nm, even more preferably from 4 nm to 12 nm, and most preferably from 5 to 10 nm.

Thus, the shell has a thickness that is smaller than the diameter of the core. With preference, the shell has a thickness that is between 2 to 4 times smaller than a diameter of the core, preferably 2.5 to 3.5 times smaller than a diameter of the core, or 3 times smaller than a diameter of the core.

In an embodiment, the catalyst system comprises colloidal nanoparticles dispersed in a medium of suspension, such as in methanol.

In an embodiment, the core-shell structure is a core-shell layered material comprising an inner layer forming a core and an outer layer forming a shell.

Preferably, the layered material has a thickness ranging between 1 nm and 30 nm, preferably between 2 nm and 20 nm as determined by EDS line scan measurement, wherein EDS line scan is carried out using a JEM-ARM 200F Atomic Resolution Analytical Microscope operating at an accelerating voltage of 200 kV, more preferably between 3 nm and 15 nm, even more preferably between 4 nm and 12 nm, and most preferably between 5 and 10 nm Whatever is the structure selected, the shell has a thickness ranging from 1 nm to 3 nm as determined by EDS line scan measurement, wherein EDS line scan is carried out using a JEM-ARM 200F Atomic Resolution Analytical Microscope operating at an accelerating voltage of 200 kV, preferably from 1.5 nm to 2.5 nm, and more preferably from 1.75 nm to 2.25 nm.

Examples of the shell-core catalyst system described herein can be used as a catalyst layer in a composite multilayered electrocatalyst (CME) that includes a polymer-based gas-diffusion layer, a current collection structure, and the catalyst layer sandwiched in between.

The current collection structure can include a carbon nanoparticle layer applied against the catalyst layer, and a graphite layer applied against the nanoparticle layer. In one possible implementation of the CME, it includes a hydrophobic polymer-based support such as polytetrafluoroethylene (PTFE); a shell-core catalyst system material deposited on top; a layer of carbon-based nanoparticles (NPs) atop the catalyst; and an ensuing layer of graphite as the electron conductive layer. In this configuration, the PTFE layer, which can substantially be pure PTFE or similar polymer, acts as a more stable hydrophobic gas-diffusion layer that prevents flooding from the catholyte; carbon NPs and graphite stabilize the metal catalyst surface; the graphite layer serves both as an overall support and current collector. In an alternative implementation, the CME includes a hydrophobic polymer-based layer; the shell-core catalyst material deposited on top; and then a layer of conductive material such as graphite deposited on top of the catalyst layer.

In this configuration, the stabilization material (e.g., carbon nanoparticles) is not present as a distinct layer in between the graphite and the catalyst layers. Other features of the CME and related $CO_2RR$ methods as described in Nature Catalyst 2018, 1, 421-428 can be used in combination with the catalyst system and methods described herein.

Therefore, the invention encompasses a system for $CO_2$ electroreduction to produce multi-carbon hydrocarbons, comprising:

an electrolytic cell configured to receive a liquid electrolyte and $CO_2$ gas;
an anode; and
a cathode comprising a catalyst system as defined above or comprising a catalyst precursor as defined below.

With preference, the electrolytic cell is configured to be operable at conditions that maximize production of multi-carbon alcohols.

The invention also relates to the use of the catalyst system according to the invention in a fuel cell.

As it will be described in detail below, the shell is preferably formed by subjecting a vacancy enriched copper sulphide particle to reduction, thereby releasing sulphur from an external layer of the particle and forming the shell depleted in sulphur while retaining the sulphur in the core.
Preparation of the Catalyst System The invention also contemplates a method of manufacturing a catalyst system comprising core-shell particles for electrocatalyzing conversion of $CO_2$ into multi-carbon hydrocarbons and/or alcohols, the method comprising the following steps:

preparing particles that comprise vacancy enriched metal sulphide;
subjecting the particles to reduction to produce a reduced metallic shell with enriched vacancies surrounding a metal sulphide core, thereby forming the core-shell particle.

In a preferred embodiment, the catalyst system is as described above.

With preference, the particles that are prepared are nanoparticles; with preference, the nanoparticles are colloidal nanoparticles.

In a preferred embodiment, the prepared nanoparticles are composed of copper sulphide.

Preferably, the particles are prepared using a solvothermal method.

In an embodiment, the step of preparing the particles comprises the following sub-steps:

dissolving $Cu_{(acac)2}$ in a solvent to form a reaction mixture;
heating the reaction mixture to form the particles;
collecting the particles from the reaction mixture.

$Cu_{(acac)2}$ is Copper(II) acetylacetonate (CAS Number 13395-16-9) and is commercially available at Merck. The solvent is selected from thiols; for example, the solvent is dodecanethiol The use of thiols is advantageous as thiols can serve as the solvent and the sulphur source.

The heating is performed at a temperature ranging from 230 to 250° C. for a duration lasting from 15 to 25 minutes. The reaction mixture is subjected to mixing during the heating step, with preference under the protection of an inert gas such as nitrogen gas or argon. The resulting nanoparticles are collected by centrifugation. Preferably, the step of preparing the particles comprises a sub-step of washing the collected particles and then drying the washed particles. For instance, the washing is performed with acetone and hexane, and the drying is performed under vacuum conditions.

In a preferred embodiment, the reduction of the particles comprises electroreduction by contacting the particles with $CO_2$ saturated electrolyte and applying a voltage to provide a current density to cause $CO_2$ gas contacting the particles to be electrochemically converted into the multi-carbon hydrocarbon. With preference, the electrolyte comprises an alkaline KOH electrolyte.

Preferably, the electroreduction is performed in a two-compartment electrochemical H-cell with a proton exchange membrane as a separator and a flow-cell configuration comprising a gas-diffusion layer with an anion exchange membrane.

To form the core-shell particles, the electroreduction is preferably conducted for at least 1 minute, more preferably for at least 2 minutes, even more preferably for at least 3 minutes, most preferably for at least 4 minutes, even most preferably for at least 5 minutes.

In an embodiment, to form the core-shell particles, the electroreduction is preferably conducted for a time ranging from 1 min to 6 minutes, preferably ranging from 2 to 5 minutes.

The catalyst system can also be made by preparing a catalyst precursor material or particles that are made of vacancy enriched metal sulphide material having an external layer that is reduceable in situ to form reduced metallic external layers with enriched vacancies coating or surrounding corresponding metal sulphide material. Thus, by subjecting the catalyst precursors to electroreduction, the core-shell catalyst system can be formed in situ.

Thus, in an embodiment, the electroreduction is performed in an electroreduction unit that is subsequently used to produce the multi-carbon hydrocarbons such that the core-shell particles are formed in situ.

The Catalyst Precursor

The invention also provides a catalyst precursor for deployment in an electrocatalysis unit for in situ formation of a catalyst system for conversion of $CO_2$ into multi-carbon hydrocarbons, the catalyst precursor comprising vacancy enriched metal sulphide nanoparticles having an external layer that is reduceable in situ to form reduced metallic shells with enriched vacancies surrounding the corresponding metal sulphide cores. The multi-carbon hydrocarbons comprise multi-carbon alcohols, such as ethanol and/or propanol.

In an embodiment, the vacancy enriched metal sulphide nanoparticles are formed by dissolving $Cu_{(acac)2}$ in a solvent to form a reaction mixture, heating the reaction mixture to form the nanoparticles; collecting the nanoparticles from the reaction mixture.

With preference, the vacancy enriched metal sulphide nanoparticles have an average diameter ranging from 1 nm to 30 nm as determined by transmission electron microscopy (TEM), preferably from 2 nm to 20 nm, more preferably from 3 nm to 15 nm, even more preferably from 4 nm to 12 nm, and most preferably from 5 to 10 nm.

The vacancy enriched metal sulphide nanoparticles have a generally spherical shape. They comprise a djurleite phase and/or have a covellite structure.

The vacancy enriched metal sulphide nanoparticles have an overall Cu/S molar ratio ranging between 1 and 3 as determined by XRF-1800 quantitative analysis with a 4 kW Thin-window X-ray Tube. Indeed, the vacancy enriched metal sulphide is the initial nanoparticle without electroreduction. The molar ratio of Cu/S is therefore between 1 and 3. After reduction, the surface V—$Cu_2S$ is reduced to metallic Cu, the ratio of Cu/S increases therefore between 3 and 7.

According to the invention, the metal is a catalytic metal, preferably the metal is copper.

The metal and sulphur atoms are advantageously distributed evenly throughout the vacancy enriched metal sulphide nanoparticles.

The invention also encompasses the use of the catalyst precursor as defined above, in an electrocatalysis operation for conversion of $CO_2$ into multi-carbon hydrocarbons; with preference, the into multi-carbon hydrocarbons comprise multi-carbon alcohols.

Method for Electrochemical Production of a Multi-Carbon Hydrocarbons and/or Alcohols The catalyst system is particularly useful in the electrocatalytic conversion of $CO_2$ into multi-carbon alcohols, as is explained and evidenced in detail. Indeed, the invention focused on enhanced alcohols production using the catalyst system described herein and provides advantageous conditions for such a production. Indeed, the catalyst system of the invention increases the energy barrier in the ethylene pathway.

For example, good selectivity for multi-carbon alcohols was found at potentials of about –0.95V vs RHE. However, when a more negative potential than –0.95V vs RHE was applied, for example, at –1.1V vs RHE, the faradic efficiency of ethylene was found to increased to 42%, while that of alcohols decreased to 3.6%. Thus, it should be noted that the core-shell catalyst systems described herein can also be used for producing other types of hydrocarbon products (e.g., ethylene) under certain corresponding electroreduction conditions.

Therefore, the invention contemplates a method for electrochemical production of a multi-carbon alcohol, comprising the steps of:
  contacting $CO_2$ gas and an electrolyte with an electrode comprising the catalyst system as defined above, such that the $CO_2$ contacts a catalyst layer comprising the catalyst system;
  applying a voltage to provide a current density to cause the $CO_2$ gas contacting the catalyst layer to be electrochemically converted into the multi-carbon alcohol; and
  recovering the multi-carbon alcohol; preferably the recovered multi-carbon alcohol comprises ethanol and/or propanol.

In accordance with the invention, the current density provided in the current collection structure is predetermined for selective electrochemical conversion of the $CO_2$ into a target multi-carbon alcohol.

In an embodiment, the electrolyte comprises an alkaline potassium compound; with preference, the electrolyte comprises KOH. Other electrolytes are also considered, such as $KHCO_3$.

In a preferred embodiment, the method comprises a step of deploying a catalyst system precursor comprising copper sulphide particles in the electrolyte and applying the voltage to:
  initiate the electrochemical production of the multi-carbon alcohol; and
  subject an external layer of the copper sulphide particles to reduction to remove sulphur therefrom and thereby form the shell of the catalyst system.

Preferably the voltage applied is ranging from 300 to 700 mV, more preferably from 400 to 600 mV, and even more preferably from 450 to 550 mV, at potentials of −0.95 V vs RHE.

The method of the invention may be operated to provide at least 6 times improvement in partial current density for the multi-carbon alcohol compared with those of $Cu_2S$ nanoparticles without vacancy under the same operating conditions. In the engineered structure, the surface Cu vacancy and the $Cu_2S$ core synergistically affect the electronic properties of the active sites and thereby the post C—C coupling intermediates and the following reaction pathway toward the production of multi-carbon alcohols over $CO_2$ reduction. The production rate of multi-carbon alcohols is, therefore, higher than those of $Cu_2S$ and pure Cu catalysts.

The method of the invention may be operated to provide at least 19 times, improvement in partial current density for the multi-carbon alcohol compared with those of pure Cu nanoparticles under the same operating conditions.

The method of the invention may be operated to provide at least 46 times improvement in partial current density for the multi-carbon alcohol compared with those of bulk $Cu_2S$ under the same operating conditions. Furthermore, the nanoparticles have higher activity compared to the bulk controls and thus leading to higher partial current density.

The method of the invention may be operated to provide at least 44 times improvement in partial current density for the multi-carbon alcohol compared with those of bulk Cu under the same operating conditions.

The invention also contemplates a method for electrochemical production of a multi-carbon hydrocarbon, comprising:
  contacting $CO_2$ gas and an electrolyte with an electrode comprising the catalyst system as defined above, such that the $CO_2$ contacts a catalyst layer comprising the catalyst system;
  applying a voltage to provide a current density to cause the $CO_2$ gas contacting the catalyst layer to be electrochemically converted into the multi-carbon hydrocarbon; and
  recovering the multi-carbon hydrocarbon.

In an embodiment, the method comprises providing a negative potential to promote selective electrochemical conversion of the $CO_2$ into a target multi-carbon alcohol; with preference, the negative potential is ranging from −1 to 0.9 V vs RHE, preferably ranging from −0.99 to −0.91 V vs RHE, more preferably ranging from −0.98 to −0.92 V vs RHE, even more preferably ranging from −0.97 to −0.93 V vs RHE, most preferably ranging from −0.96 to −0.94 V vs RHE, and even most preferably is-0.95 V vs RHE.

In another embodiment, the method comprises providing a negative potential to promote electrochemical conversion of the $CO_2$ into a target multi-carbon hydrocarbon; with preference, the target multi-carbon hydrocarbon is ethylene; and/or the negative potential is −1.1V vs RHE.

Methods

Computational Details. The projected augmented wave (PAW) approach and the generalized gradient approximation (GGA) of Perdew, Burke and Ernzerhof (PBE) with DFT-D3 method for the van der Waals correction employed in the Vienna ab initio Simulation Package (VASP) were used to perform all the plane wave density functional theory (DFT) computations.

Electrochemical measurements. Electrocatalytic measurements were carried out in a three-electrode system at an electrochemical station (AUT50517). All potentials were measured against an Ag/AgCl reference electrode (3M KCl, BASi) and converted to the reversible hydrogen electrode (RHE) reference scale using:

$$E(\text{versus RHE}) = E(\text{versus Ag/AgCl}) + 0.197V + 0.0591 \times pH$$

pH is the acid-base degree.

$CO_2$ reduction electrolysis and product analysis. The electrolysis was performed in a two-compartment electrochemical H-cell with a proton exchange membrane (Nafion 117) as the separator and a flow-cell configuration consisting of a gas diffusion layer with an anion exchange membrane.

Sample characterizations as well as the electrochemical measurements and computational simulation details are provided in the supplementary description provided below.

Computational Details. Models of a pristine copper slab, a copper slab with a single atomic vacancy, and a $Cu_2S/Cu$ core/shell model with an atomic vacancy model are approximated by slab models (3×3×4 for Cu and Cu with Cu vacancy, and 3×3×6 for Cu with Cu vacancy and subsurface S slab) in a vacuum with the adsorbates binding to the active sites of the surface. Dipole corrections and spin polarizations are implemented. DFT-D3 method with Becke-Jonson damping is performed for the van der Waals correction. To resemble the real bulk material and the surface, the two top layers are free to move due to interaction with the adsorbates, while the other layers are fixed in their optimized crystalline positions. T A cut-off energy of 450 eV for the plane wave basis sets and a 2×2×1 Γ-centered Monkhorst-Pack mesh for the k-points sampling in the first Brillouin zone, with a first order Methfessel-Paxton smearing parameter σ of 0.1 eV ensured that the energy convergence criteria is better than 1 meV for a vacuum of 20 Å or greater. The self-consistent field (SCF) convergence criterion is set to $1 \times 10^{-4}$ eV for electronic iteration and the ionic relaxation continued until the maximum force was less than 0.02 eV/Å that was updated by the conjugate gradient approach. To calculate the thermodynamic properties, gas phase molecules are approximated by an ideal gas, while the adsorbates are treated using the quasi-harmonic approximation. All vibrational calculations are performed using the Atomic Simulation Environment (ASE) code. All barrier calculations were performed using the climbing image nudged elastic band method (CI-NEB) with 4 images.

Computational Model. This study investigates the $CO_2$ reduction to ethanol and ethylene (shown with * in the following equations). Three different models are considered:
  1) Pristine copper (Cu) as the control model.
  2) Cu with Cu vacancy as the control model (Cu—V).
  3) Cu with Cu vacancy and subsurface sulphur (S) as the designed catalyst ($Cu_2S/Cu$—V).

Figure 3:
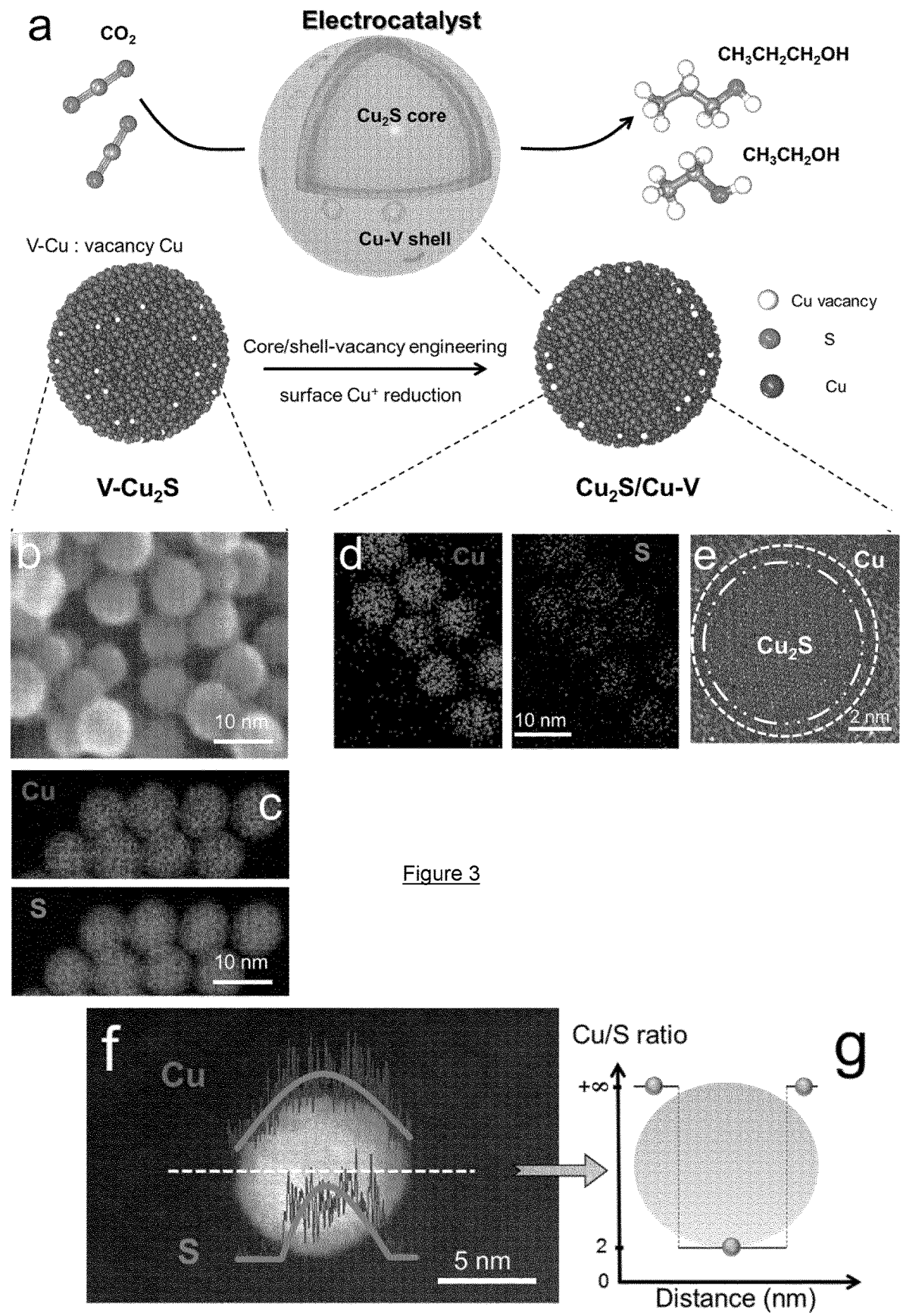
FIG. 3 Catalyst design and structural characterization. (a) Schematic illustration of Cu$_2$S/Cu—V core/shell vacancy engineering (CSVE) electrocatalyst design for multi-carbon alcohols production from CO$_2$ reduction. (b-c) TEM and EDS mapping of the original V—Cu$_2$S nanoparticles, showing the uniform size and the homogeneous distribution of Cu and S. (d-g) EDS mapping, HRTEM, and EDS line scan of the reduced CSVE nanocatalysts after electrochemical reduction, showing the removal of sulphur from the nanoparticle surface. V—Cu means Cu with surface vacancies.

The core/shell model is demonstrated in FIG. 3. All surfaces are fully relaxed before exposing them to the reaction intermediates. In each model and in each step of the simulations, the study examined different configurations for the adsorbed species and the most stable ones with the lowest energy are chosen to calculate the reaction energy diagram. Surfaces with vacancy in interaction with adsorbates, in few occasions, are subject to reconstruction. These configurations are avoided in the study's calculations. The calculated vacancy formation energy for Cu$_2$S/Cu—V is 2.051 eV which is higher than that of the defected pure copper, Cu—V, with 1.3 eV vacancy formation energy.

Reaction Free Energy Calculations. According to Koper et al., reaction pathways for ethanol and ethylene from CO$_2$ reduction are considered similar until the C$_2$H$_3$O intermediate. Thereafter, the reaction pathway for ethylene and ethanol splits as mentioned in the following:

Pathway A (Ethylene pathway):

*C$_2$H$_3$O+(H$^+$+e$^-$)→*O+C$_2$H$_4$      A1:

*O+(H$^+$+e$^-$)→*OH      A2:

*OH+(H$^+$+e$^-$)→*+H$_2$O      A3:

Pathway B (Ethanol pathway):

*C$_2$H$_3$O+(H$^+$+e$^-$)→*C$_2$H$_4$O      B1:

*C$_2$H$_4$O+(H$^+$+e$^-$)*C$_2$H$_5$O      B2:

*C$_2$H$_5$O+(H$^+$+e$^-$)→*+C$_2$H$_5$OH      B3:

To find the free energy diagram of each process the study calculated the reaction free energy ($\Delta G_{rxn}$). The details of this calculation for the pathways A and B are explained here:

$$\Delta G_{rxn}^{(A1)} = [G*_O + G_{C_2H_4}] - \left[G*_{C_2H_3O} + \frac{1}{2}G_{H_2}\right] =$$

$$[G*_O - G*_{C_2H_3O}] + \left[G_{C_2H_4} - \frac{1}{2}G_{H_2}\right]$$

$$\Delta G_{rxn}^{(A2)} = [G*_{OH}] - \left[G*_O + \frac{1}{2}G_{H_2}\right] = [G*_{OH} - G*_O] + \left[-\frac{1}{2}G_{H_2}\right]$$

$$\Delta G_{rxn}^{(A3)} = [G* + G_{H_2O}] - \left[G*_{OH} + \frac{1}{2}G_{H_2}\right] =$$

$$[G* - G*_{OH}] + \left[G_{H_2O} - \frac{1}{2}G_{H_2}\right]$$

$$\Delta G_{rxn}^{(B1)} = [G*_{C_2H_4O}] - \left[G*_{C_2H_3O} + \frac{1}{2}G_{H_2}\right] =$$

$$[G*_{C_2H_4O} - G*_{C_2H_3O}] + \left[-\frac{1}{2}G_{H_2}\right]$$

$$\Delta G_{rxn}^{(B2)} = [G*_{C_2H_5O}] - \left[G*_{C_2H_4O} + \frac{1}{2}G_{H_2}\right] =$$

$$[G*_{C_2H_5O} - G*_{C_2H_4O}] + \left[-\frac{1}{2}G_{H_2}\right]$$

$$\Delta G_{rxn}^{(B3)} = [G* + G_{C_2H_5OH}] - \left[G*_{C_2H_5O} + \frac{1}{2}G_{H_2}\right] =$$

$$[G* - G*_{C_2H_5O}] + \left[G_{C_2H_5OH} - \frac{1}{2}G_{H_2}\right]$$

In these equations, the Computational Hydrogen Electrode (CHE) is used and, thus, the proton-coupled electron pair is replaced by the hydrogen gas. The Gibbs free energy at room temperature (T=298.15 K) and ambient pressure (P$_{gage}$=0 Pa), by definition, is:

G=H−TS=U+pV−TS=E+ZPE+∫$_0^T$C$_v$·dT−TS where H is the enthalpy, U is the internal energy, V is the system volume, E is the DFT electronic structure energy, ZPE is the Zero Point Energy arising from the vibrational energy at 0K, C$_v$ is the heat capacity and the relevant integral demonstrates the energy captured by the material from 0K to room temperature in terms of vibration, rotation and translation, and S is the entropy of the system. The ZPE, TS and C$_v$ terms for the molecular C$_2$H$_4$, H$_2$O and H$_2$ are adopted from Peterson et al. while the parameters for C$_2$H$_5$OH are adopted from Calle-Vallejo and Koper. These are added to our calculated DFT electronic structure energy to make a fair comparison with the previous studies on copper.

In general, for heterogeneous catalysis, the last three terms in the Gibbs free energy for a solid surface do not change appreciably in the presence and absence of the adsorbates and are cancelled out in the above equations. However, the gas molecules show considerably different vibrational properties—and consequently ZPE, heat capacity and entropy—when free or adsorbed. Therefore, these terms are calculated for the adsorbates but for the solid catalyst the calculated DFT energy is sufficient.

For ethylene, the main energy barrier after the adsorbed CH$_2$CHO intermediate is the last protonation step to reduce adsorbed OH to water (~0.4 eV). For ethanol, the first protonation step of the CH$_2$CHO intermediate, which reduces it to CH$_3$CHO, is the main obstacle (~0.2 eV) after the branch. However, both ethylene and ethanol reaction pathways proceed downhill after the application of 0.5 eV to overcome the earlier dimerization energy barrier.

Table 1 demonstrates the Gibbs free energies of the reactants and the possible products in their molecular gaseous states.

TABLE 1

|  | Cu$_2$S | Cu |
|---|---|---|
| −0.9 V vs RHE | C$_2$H$_4$:29% | C$_2$H$_4$:34% |
|  | C$_2$H$_5$OH:6% | C$_2$H$_5$OH:3% |
| −1.0 V vs RHE | C$_2$H$_4$:45% | C$_2$H$_4$:50% |
|  | C$_2$H$_5$OH:4% | C$_2$H$_5$OH:2% |

For each surface, the potential determining step (PDS) which determines the required overpotential to make all the reaction steps downhill is mentioned in table 2.

TABLE 2

|  | Cu (U$^0$ = −0.373 V) | | Cu with vacancy (U$^0$ = −0.305) | | Core/shell-vacancy (U$^0$ = 0.191) | |
|---|---|---|---|---|---|---|
|  | U = 0 V | U = −0.5 V | U = 0 V | U = −0.5 V | U = 0 V | U = −0.5 V |
| Ethylene Pathway | 0.672 | 0.422 | 0.500 | 0.251 | 1.277 | 1.027 |
| Ethanol Pathway | 0.720 | 0.470 | 0.684 | 0.434 | 0.602 | 0.352 |

Activation Energy Barrier Calculations. The computational hydrogen electrode (CHE) that is used to calculate the free energy diagram under different applied potentials, captures energetic differences between elementary steps in proton-coupled-electron-transfer (PCET) processes. In this model, the chemical potential of the proton-electron pair (H$^+$+e$^-$) is considered to be equivalent to the chemical potential of a hydrogen molecule (H$_2$) at the reference reversible hydrogen electrode (RHE) potential. However, DFT models cannot determine the chemical potential of a sole proton (H$^+$) in a bulk electrolyte. Therefore, similar to previous studies on copper, we determined the activation energy barrier for an equivalent hydrogenation reaction. Hence, the proton-coupled-electron system was considered to be reduced to a surface adsorbed proton via the following equation in:

(H$^+$+e$^-$)+*→+*H

Figure 4:
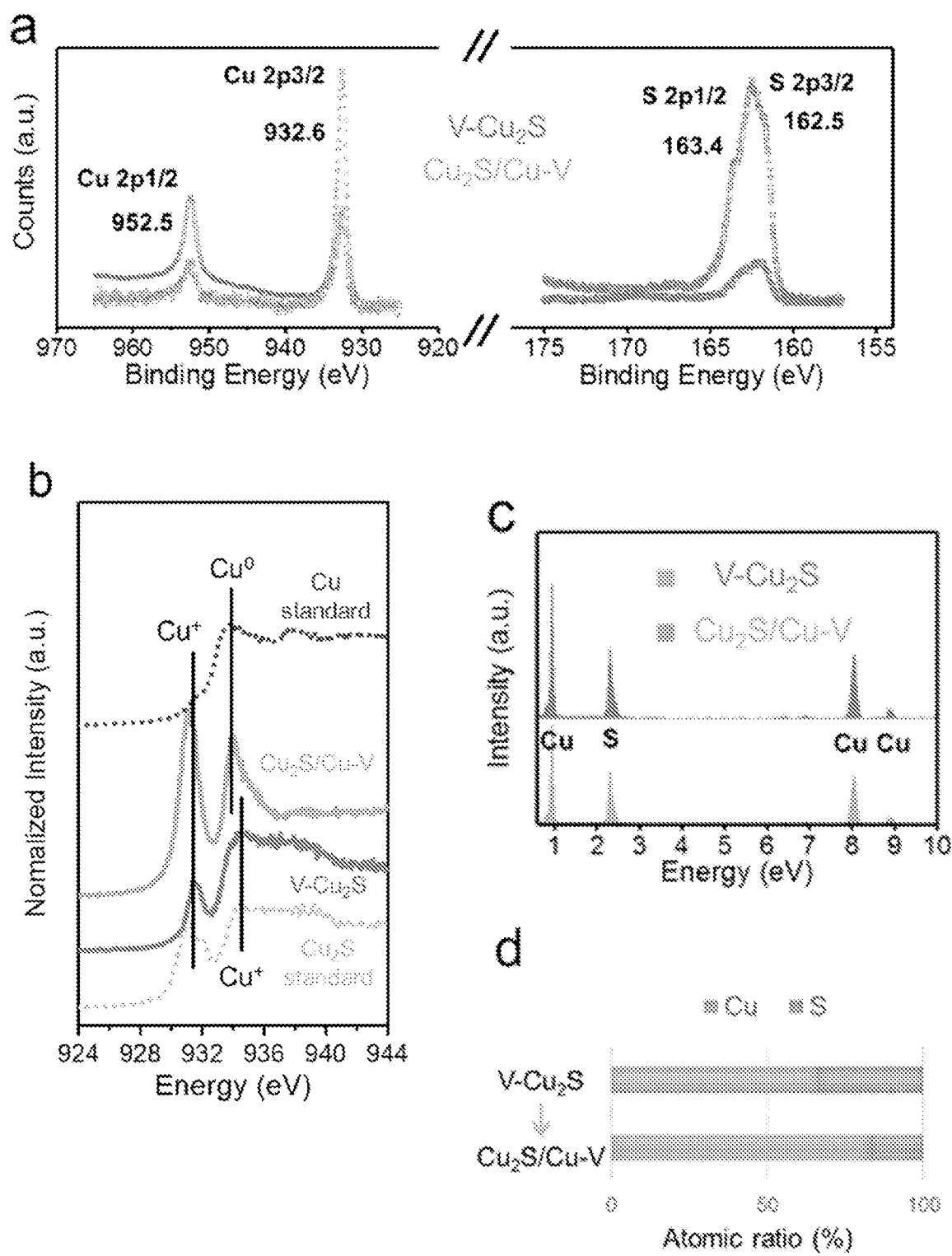
FIG. 4 represents the characterizations of the CSVE catalyst. (a) XPS of the original V—Cu$_2$S nanoparticles and XPS sputter depth profiling of the derived CSVE catalyst (Cu$_2$S/Cu—V). (b) Cu L$_3$-edge XAS spectra of the original V—Cu$_2$S nanoparticles, the derived CSVE catalyst, a reference Cu$_2$S standard and a reference Cu standard. (c) EDX, showing the change of elements between V—Cu$_2$S and CSVE catalyst. (d) The atomic ratio of copper and sulphur in the V—Cu$_2$S and CSVE catalyst, calculated by XRF. (e) Positron lifetime spectra and (f-g) Schematic representations of trapped positrons of copper vacancies.
Figure 4:
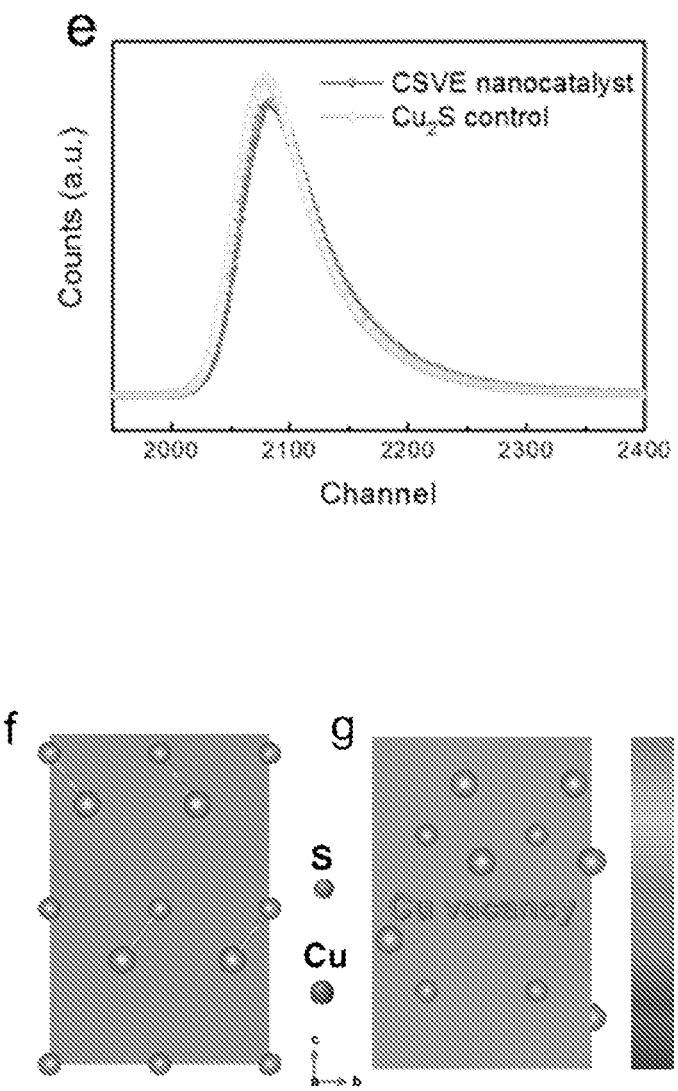

The potential under which this reaction is in equilibrium (the Gibbs free energy equal to zero) is considered as the equilibrium potential ($U^0$). Therefore, the activation energy barrier ($E_{act}$) calculated via DFT can be extrapolated to the other potentials by the following equation:

$$E_{act}(U)=E_{act}^0(U^0)+\beta(U-U^0)$$

where $\beta$ is the reaction effective symmetry factor and was approximated to be 0.5 in this work. The detailed results of the calculated activation energy barrier for the first hydrogenation step on all three models for both ethylene and ethanol pathways are depicted in FIG. 4 and mentioned in Table 4.

Bader Charge Analysis and Electron Density of States. Due to the proposed vacancy defect in the catalyst, the copper-copper bond length is enlarged. Therefore, oxygen (an intermediate in ethylene pathway) prefers the bridge site with a two O—Cu coordination number as the adsorption site, while in pristine copper the hollow site with a four O—Cu coordination number is more preferable. The calculated electrostatic charge density by Bader charge analysis also shows weaker bonding between the adsorbed oxygen and the surface copper in a core/shell-vacancy system as compared to a pristine copper surface with strong four-fold bonding. This weak bonding might be the main reason ethylene production is less favourable on the core/shell-vacancy catalyst. On the other hand, the strong bonding on pristine copper could be the main reason that the OH desorption step in the largest barrier (after the $CH_3CHO$ branch) in ethylene production.

XPS core level binding energy (CLBE) shift calculation. The study simulated the XPS CLBE shift ($E_{CLBEs}$) for the $Cu_2S/Cu$ core/shell model and the $Cu_2S/Cu$—V core/shell vacancy model using VASP code. The relative CLBE shift between two systems is defined as:

$$E_{CLBEs}=[E_{system}(n_c-1)-E_{system}(n_c)]$$

where $n_c$ is the total number of core electrons in the system, $E_{system}(n_c-1)$ is the total energy of a system with a single core electron removed from the atom of interest, and $E_{system}(n_c)$ is the total energy of the same system with all core electrons present in the system. As the absolute, it is not comparable to the experiment result if we calculate CLBE shift for a single system. It is the theoretically calculated CLBEs shift that is comparable to the shift measured by experimental XPS.

Extended x-ray absorption fine-structure (EXAFS) simulation. The study used IFEFFIT, an ab initio software to calculate phase and amplitudes. These ab initio phases and amplitudes were used in the EXAFS equation:

$$\chi(k) = S_0^2 \sum_j \frac{N_j}{kR_j^2} f_{eff_i}(\pi, k, R_j) e^{-2\sigma_j^2 k^2} e^{-\frac{2R_j}{\lambda_j(k)}} \sin(2kR_j + \phi_{ij}(k))$$

The neighbouring atoms to the central atom(s) are divided into j shells, with all atoms with the same atomic number and distance from the central atom grouped into a single shell. $N_j$ denotes the number of neighbouring atoms in shell j at a distance of $R_j$ from the central atom. $f_{eff_1}(\pi, k, R_j)$ is the ab initio amplitude function for shell j. The Debye-Waller term $e^{-2\sigma_j^2 k^2}$ accounts for damping due to static and thermal disorder in absorber-back scatterer distances. The mean free path term $$e^{-\frac{2R_j}{\lambda_j(k)}}$$

reflects losses due to inelastic scattering, where $\lambda_j(k)$ is electron mean free path.

Transfer process of the hydrophobic nanocrystals to an aqueous solution. In a typical transfer process, 200 μL 3-mercaptopropionic (MPA) was added into 15 mL of chloroform with 10 mg sample. The turbid solution was stirred for 3 h, followed by centrifugation. The precipitate was washed with acetone and further dried in a vacuum chamber.

Characterization. X-ray diffraction patterns (XRD) were measured on a Philips X'Pert Pro Super X-ray diffractometer equipped with graphite-monochromatized Cu Kα radiation. X-ray photoelectron spectroscopy (XPS) was carried out with the Thermo Scientific K-Alpha XPS system. An Al Kα source with a 400 μm spot size was used for measurements to detect photo-electrons at specific energy ranges to determine the presence of specific elements. Sputter depth profiling was performed with an ion gun at 1 keV in order to avoid spurious features (e.g. ion beam damage), at a rate of approximately 1 nm/s, where each step has a duration of 20 s. Transmission electron microscopy (TEM) and high-resolution transmission electron microscopy (HRTEM) observations, which were performed on Hitachi H-7650 and JEOL-2010F with an acceleration voltage of 200 kV. High-angle annular dark field scanning transmission electron microscopy (HAADF-STEM) and Energy dispersive X-ray spectroscopy (EDS) were carried out using a JEM-ARM 200F Atomic Resolution Analytical Microscope operating at an accelerating voltage of 200 kV. Elemental mappings and line scans were collected by a Gatan GIF Quantum 965 instrument. Elemental ratio analysis for the samples was measured by an XRF-1800.

Electrochemical active surface area (ECSA) measurement. To determine the ECSA of the electrodes, the study uses two methods to estimate the ECSA. In the first method, cyclic voltammetry (CV) using the ferri-/ferrocyanide redox couple ($[Fe(CN)_6]^{3-/4-}$) was employed. The CV was carried out in a nitrogen-purged 5 mM $K_3Fe(CN)_6$/0.1M KCl solution with Ag/AgCl (3M, KCl) and platinum gauze as the reference electrode and counter electrode, respectively. ECSA can be calculated according to the Randles-Sevcik equation at room temperature:

$$I_p=(2.69\times10^5)n^{3/2}AD^{1/2}Cv^{1/2}$$

where $I_p$ is the peak current (A), n=1, D is the diffusion coefficient of $K_3Fe(CN)$ ($7.9\times10^{-6}$ $cm^{-2}s^{-1}$), C is the concentration of $K_3Fe(CN)_6$ ($5\times10^{-6}$ mol $cm^{-3}$), v is scan rate (V/s) and A is the electrode area ($cm^{-2}$).

In the second, the study uses a double layer capacitances method to measure the surface roughness factors for the samples relative to polycrystalline Cu foil. ECSA=$R_f\times S$, where S stands for the real surface area of the smooth metal electrode, which was generally equal to the geometric area of glassy carbon electrode (in this work, S=0.19 $cm^2$). The roughness factor $R_f$ was estimated from the ratio of double-layer capacitance C for the working electrode and the corresponding Cu foil electrode, that is, $R_f=C/C_{Cu\,foil}$. The C was determined by measuring the geometric current density at a potential at which no Faradaic process was occurring against the scan rate of cyclic voltammetry (CV). CV was performed in the same electrochemical cell as in the bulk electrolyses with a Nafion proton exchange membrane and 0.1 M $KHCO_3$ electrolyte. The liner slope gives the C.

IR correction. The study used potentiostatic electrochemical impedance spectroscopy (PEIS) to determine uncompensated resistance ($R_u$). The resistance values were 80 Ohms for $Cu_2S$—V, 78 Ohms for $Cu_2S$, and 75 Ohms for Cu in H-cell, and 6.0 Ohms for $Cu_2S$—V, 5.5 Ohms for $Cu_2S$, and 5.0 Ohms for Cu in Flow-cell configurations respectively. At all potentials tested, the potential was manually corrected using Ohm's law:

E=E/applied−$iR_s$x0.90(E/applied is applied potential,$i$ is the current measured, and compensating for 90% of the resistance).

$CO_2$ reduction product analysis. Gas-phase and liquid-phase products were quantified by gas chromatography (GC) and nuclear magnetic resonance (NMR) spectroscopy, respectively.

The GC, running Argon (Linde, 99.999%) as a carrier gas, contained a Molecular Sieve 5A capillary column and a packed Carboxen-1000 column which were used together to separate hydrogen, methane, ethylene and $CO_2$. A thermal conductivity detector (TCD) was used to quantify hydrogen ($H_2$) and carbon monoxide (CO) and a flame ionization detector (FID) was used to quantify methane ($CH_4$) and ethylene ($C_2H_4$).

The liquid products were quantified using Nuclear magnetic resonance spectroscopy (NMR). $^1H$ NMR spectra of freshly acquired samples were collected on Agilent DD2500 spectrometer in 10% $D_2O$ using water suppression mode, with Dimethyl sulfoxide (DMSO) as an internal standard. Sixteen second relaxation time between the pulses was used to allow for complete proton relaxation. The faradic efficiency (FE) of the liquid products was calculated from the total amount of charge Q (in units of coulombs) passed through the sample and the total amount of the liquid products produced n (in moles). Q=I×t, where I (in amperes) is the reduction current at a specific applied potential and t is the time (in seconds) for the constant reduction current.

The faradic efficiency of the liquid products can be calculated as follows as examples:

$$FE_{EtOH} = 12 \times F \times \frac{n_{EtOH}}{Q} = 12 \times F \times \frac{n_{EtOH}}{(I \times t)}$$

$$FE_{PrOH} = 18 \times F \times \frac{n_{PrOH}}{Q} = 18 \times F \times \frac{n_{PrOH}}{(I \times t)}$$

where F is the Faraday constant.

Ex-situ X-ray absorption (XAS) measurement. The ex-situ X-ray absorption measurements at the copper $L_3$-edge were performed at the spherical grating monochromator (SGM) beamline 11ID-1 at the Canadian Light Source. The scanning energy range of the Cu $L_3$-edge was between 920 and 960 eV.

Positron Annihilation Measurement. Sandwiched samples composed of catalyst, $^{22}Na$ source and catalyst with a total count of 2 million were used for the positron lifetime experiments. A fast-slow coincidence ORTEC system with a time resolution of 270 ps full width at half-maximum was utilized. The ATSUP method was used for calculating positron lifetime. The electron density and the positron crystalline Coulomb potential were built via the non-self-consistent superposition of free atom electron density and Coulomb potential in the absence of the positron.

Nanoparticles average diameter: The morphologies of the nanoparticles are observed by Transmission Electron Microscopy (TEM) images and the diameters are calculated by Image J software.

EXAMPLES

The advantages of the present invention are illustrated by the following examples. However, it is understood that the invention is not limited to these specific examples.

The present invention evaluated catalyst systems and structures and found that steering post-C—C coupling selectivity can enable high-efficiency electroreduction of carbon dioxide to multi-carbon alcohols.

Engineering new copper-based catalysts that favour high-value alcohols is desired in view of the energy density, ready transport, and established use of these liquid fuels. In the design of catalysts, much progress has been made to target deliberately the C—C coupling step; while comparatively little effort has been expended to target post-C—C coupling reaction intermediates. This study showed a new class of core/shell vacancy engineering (CSVE) catalysts that utilize sulphur atoms in the nanoparticle core and intentional copper vacancies in the shell to achieve efficient electrochemical $CO_2$ reduction to propanol and ethanol; the catalyst did so by shifting selectivity away from the competing ethylene reaction. The study increased the ratio of alcohol-to-ethylene by over 6 times compared to bare-copper nanoparticles, highlighting a new approach to electro-produce alcohols instead of alkenes. The study achieved a C2+ alcohol production rate of 126 mA cm$^{-2}$ with a selectivity of 32±1% Faradaic efficiency (FE).

The renewable-energy-powered electrocatalytic reduction of carbon dioxide ($CO_2$) to value-added carbon-based products offers to contribute crucial energy storage to the effort to address growing energy demand. Recent progress in electrocatalytically converting $CO_2$ has resulted in the production of gaseous carbon products such as carbon monoxide (CO), methane ($CH_4$), and ethylene ($C_2H_4$), and C1 liquids such as formate (HCOOH).

The production of liquid multi-carbon alcohols is also highly desired: it stands to enable the synthesis of sustainable fuels that leverage high energy densities (23 KJ/L ethanol, 27 KJ/L propanol) for long-range transportation applications. Unfortunately, the production of multi-carbon alcohols via direct $CO_2$ electroreduction remains below that required for economic viability due to the limited selectivity and low activity of present-day catalysts.

Among electrocatalysts for $CO_2$ reduction, Cu-based materials are the most prone to reduce $CO_2$ to C2 and above products, with alkenes traditionally dominating multi-carbon product formation. To develop more efficient electrocatalysts for alcohol production, it is desirable to modify the catalyst structure to promote the desired alcohol and suppress alkene electrosynthesis. Additionally, it would be advantageous to understand the mechanisms that underlie selectivity to enable further catalyst refinement.

In the present invention, it was reasoned that—since ethylene and ethanol share a penultimate reaction intermediate (*$C_2H_3O$)—one could potentially modify a catalyst's surface structure to target the hydrogenation of this intermediate, and thereby promote C2 liquid production. Suppressing oft-produced ethylene could enhance production and selectivity toward alcohols.

Example 1: Effect of the Introduction of S in a Cu Catalyst

Several ways have previously been employed to engineer Cu surfaces to tune the energetics of intermediate binding. Introducing metal atomic vacancy defects can influence electrocatalytic performance by adjusting the electronic structure of neighbouring atoms and consequently the energy barriers of the rate-limiting reaction intermediates. Copper sulphide structures may be of interest because they may be able to provide a means to form stable surface defects and control the density of surface vacancies. Additionally, copper sulphide derived catalysts can provide long-range modifications of the local density of surface states by introducing sulphur into the Cu structure and affect thereby CO binding.

This obtained initial results revealing that varying Cu catalyst by introducing S could lead to a notable difference in the ratio of ethanol to ethylene produced (see Table 1). These data lead to examination in greater depth, using computational analysis, a key rate-limiting step along the $CO_2$-to-C2 pathway. In computational studies, it was found that a modified $Cu_2S$ core with Cu surface could account for modulation in branching in favour of ethanol relative to ethylene.

Specifically, DFT studies examine the energetics seen by the adsorbed $CH_2CHO$ intermediate that may influence alcohol vs ethylene electrosynthesis. These studies point to strategies to switch $CO_2$ reduction reaction pathways from ethylene to alcohol.

The studies further included a systematic study of S-enriched Cu and surface vacancies, synthesizing a $Cu_2S$/Cu—V (V: vacancy) nanoparticle structure that enables the controllable introduction of vacancies on a copper surface shell with a copper sulphide core. This core/shell-vacancy engineering (CSVE) catalyst enabled modifying the C2 reaction pathway, shifting selectivity away from ethylene and toward multi-carbon alcohols.

Example 2: Theoretical Simulations Predict Selectivity Control

To investigate the influence of a modified Cu core/shell structure and surface Cu vacancies on the final ethylene and ethanol reaction steps, density functional theory (DFT) was used to characterize changes in energy barriers relative to the case of pristine Cu. $CO_2$ reduction to multi-carbon products proceeds through the dimerization or protonation of adsorbed CO intermediates. It has been shown that CO electroreduction to ethanol shares a similar pathway with ethylene up until the last three proton-coupled electron transfer steps. At this late stage, the adsorbed $CH_2CHO$ intermediate (*$C_2H_3O$) may proceed to ethanol through further carbon protonation; or to ethylene by leaving an oxygen atom adsorbed on the surface.

The effect of surface modifications on the thermodynamics of the adsorbed $CH_2CHO$ intermediate was studied, and in turn the selectivity for ethylene versus ethanol production. The inventors have created three model systems: a pristine copper slab, a copper slab with a single atomic vacancy, and a $Cu_2S$/Cu core/shell model with an atomic vacancy (see FIG. 1a). Then, the following proposed reaction mechanisms representative of ethylene and ethanol production were explored:

Ethylene Pathway:

$$*C_2H_3O+(H^++e^-)\rightarrow*O+C_2H_4 \quad (1)$$

$$*O+(H^++e^-)\rightarrow*OH \quad (2)$$

$$*OH+(H^++e^-)\rightarrow*+H_2O \quad (3)$$

Ethanol Pathway:

$$*C_2H_3O+(H^{30}+e^-)\rightarrow*C_2H_4O \quad (4)$$

$$*C_2H_4O+(H^++e^-)\rightarrow*C_2H_5O \quad (5)$$

$$*C_2H_5O+(H^++e^-)\rightarrow*+C_2H_5OH \quad (6)$$

The following discussion regarding energies are related to the steps starting from *$CH_2CHO$ mentioned in reactions 1 to 6. This study found that on pristine copper (FIG. 1b and Table 2), both ethylene and ethanol have a low thermodynamic energy barrier (~0 eV) with a kinetic energy barrier of 0.422 and 0.470 eV (at applied −0.5 V potential, the required potential to overcome the rate determining C—C coupling step). These are surmountable at room temperature. The introduction of a surface copper vacancy (FIG. 1c and Table 2) slightly increases the energy barrier for ethylene production (0.025 eV), though it remains thermodynamically favored; while the vacancy has a negligible effect on the ethanol pathway. Thus, the activation energy barriers at applied potential of −0.5 V for both ethylene (0.251 eV) and ethanol (0.434 eV) can be surmounted at room temperature.

Interestingly, a vacancy present on a copper shell with a $Cu_2S$ core increases the energy barrier in the ethylene pathway (1.027 eV), while leaving the ethanol pathway mostly unaffected (0.352 eV) (FIG. 1d). Thus, if one applies an overpotential of 0.5 V (i.e., the required overpotential to overcome the early C—C coupling energy barrier), the ethanol pathway remains exergonic, but the ethylene pathway becomes unfavourable (FIG. 1e-g and Table 2) suggesting selective production in favour of ethanol is achievable.

These results suggest that subsurface sulphur atoms and copper vacancy defects shift the balance in favour of ethanol by suppressing ethylene production through this common pathway.

Example 3: Catalyst Synthesis and Characterization

In light of these DFT findings, it was sought to synthesize a surface-vacancy-enriched copper sulphide/copper core/shell catalyst. A colloidal vacancy enriched $Cu_2S$ (V—$Cu_2S$) nanoparticles was first prepared. Cuprous sulphide nanoparticles synthesized using the solvothermal method enable controlled copper vacancies in the surface structure of the catalyst. Next, the V—$Cu_2S$ was reduced in a $CO_2$ saturated electrolyte, yielding a reduced metallic copper shell with enriched vacancies surrounding a $Cu_2S$ core.

V—$Cu_2S$ nanoparticle synthesis. Synthesis of the copper (I) sulphide nanocrystals with controlled copper vacancies was performed according to a previously reported method described in Zhuang et al., Chem. Commun., 2012, 48, 9762-9764 with slight modification. In a typical procedure, 130 mg Cu(acac)$_2$ was dissolved by 30 mL dodecanethiol (DDT) in a three-neck flask with magnetic stirring under the protection of nitrogen gas and heated at 240° C. for 20 min. The resulting V—$Cu_2S$ nanoparticles (V: vacancy) were collected by centrifugation, washed with acetone and hexane three times, and dried within a vacuum chamber.

$Cu_2S$ nanoparticles synthesis. The copper (1) sulphide nanoparticles without copper vacancies were prepared using a previously reported method (Wu et al., see below). 1.25 mmol of ammonium diethyldithiocarbamate was mixed with 10 mL of dodecanethiol and 17 mL of oleic acid in a three-neck flask. The solution was heated up to 110° C. under Argon (Ar) flow followed by a quick injection of a suspension composed of 1 mmol of copper(II) acetylacetonate and 3 mL of oleic acid. The solution was then quickly heated up to 180° C. and kept at that temperature for 20 min. The resulting $Cu_2S$ nanoparticles were collected by centrifugation, washed with acetone and hexane three times and further dried in a vacuum chamber.

Cu nanoparticles synthesis. In a typical synthesis of metallic copper nanoparticles (see Guo, below), 1.2 mmol CuBr and 15 mL oleylamine (OLA) were mixed in a three-neck flask under stirring at 80° C. for 30 min, then 1 mmol trioctylphosphine (TOP) was added and reacted at 80° C. until obtaining a colourless solution. The mixed solution was heated to 260° C. quickly and kept for 1 h. The resulting Cu nanoparticles were precipitated by centrifugation, purified with acetone and hexane three times and further dried in a vacuum chamber.

Preparation of V—$Cu_2S$-derived $Cu_2S$/Cu—V (CSVE) core/shell nanoparticles. During $CO_2$ reduction, V—$Cu_2S$ nanoparticles are transformed to $Cu_2S$/Cu—V core/shell nanoparticles by surface Cu* reduction. Such core/shell nanoparticles can be obtained after initial running (2-5 min).

Working electrode preparation and $CO_2$ reduction measurements. To prepare a catalyst-coated glassy carbon electrode in an H-cell, 10 mg of V—$Cu_2S$ nanoparticles are mixed with 40 μL of 5 wt % Nafion solutions and dispersed in 1 mL of 3:7 vol/vol methanol/water mixed solvent. The solution is sonicated for at least 30 min to form a homogeneous ink. For Flow-cell, we deposited 10 mg of catalyst mixed with 40 ul of 5 wt % Nafion in 1 mL methanol on a carbon gas-diffusion layer using the air-brush. We combined the diffusion layer coated catalyst, anion exchange membrane, and nickel anode together using PTFE spacers such that a liquid electrolyte could be introduced into the chambers between the anode and membrane as well as the membrane and the cathode. Gaseous $CO_2$ could then be passed behind the gas-diffusion layer and diffuse into the liquid electrolyte present at the catalyst.

In H-cell, the electrolyte was 0.1 M $KHCO_3$ saturated with $CO_2$, which was delivered into the cathodic compartment at a rate of 20.00 standard cubic centimetres per minute (s.c.c.m.). In Flow-cell, the electrolytes (KOH solution of various concentrations, 20 mL) were circulated through the electrochemical cell using peristaltic pumps. The electrolyte flow was kept at 10 mL min$^{-1}$. The $CO_2$ (Linde, 99.99%) flow was kept constant at 50 mL min$^{-1}$ using a mass flow controller.

Characterization

To investigate the core/shell structure and to query the extent of surface vacancies, the nanoparticles were analyzed before and after reduction. The morphology of the copper sulphide nanoparticles was characterized using transmission electron microscopy (TEM, FIG. 2a), high-resolution TEM (HRTEM, FIG. 2b) and high-angle annular dark-field scanning TEM (HAADF-STEM, FIG. 3b and FIG. 2c). The nanoparticles have a high degree of uniformity and an average size of 8.5 nm. Energy dispersive X-ray spectroscopy (EDS) mapping data (FIG. 3c) reveal that copper and sulphur are distributed evenly throughout the particle. Powder x-ray diffraction (PXRD) analysis (FIG. 2d) shows good agreement with the standard $Cu_{1.94}S$ djurleite phase, thus indicating a non-stoichiometric ratio between copper and sulphur.

The active nanocatalyst used for $CO_2$ reduction is then produced from the electrochemical reduction of the V—$Cu_2S$ nanoparticles which removes sulphur from the surface, thereby constructing $Cu_2S$/Cu—V, i.e. a $Cu_2S$ core with an ultrathin metallic copper shell containing copper vacancies. In these nanoparticles, elemental Cu enriches the nanostructure, while the sulphur signal is decreased but still present, indicating that a fraction of sulphur has been removed during $CO_2$ reduction (FIG. 3e). To examine the sulphur distribution in the derived structure in detail, we acquired an EDS line scan: it revealed that sulphur mainly concentrates in the core of the nanoparticle, confirming the picture of a $Cu_2S$/Cu core/shell nanostructure (FIG. 3 f-g).

To explore the variation in nanoparticles structure during $CO_2$ reduction, and gain insight into the electronic configuration, the study used X-ray photoelectron spectroscopy (XPS) to probe the chemical composition of the copper sulphide nanoparticles before and after the $CO_2$ reduction reaction. As shown in FIG. 4a, the Cu peaks, which possess a weak asymmetric tail, agree with a covellite structure. Combining with XPS core level binding energy simulation results, the study found consistent support for the view that the CSVE catalyst possesses Cu defects. Results of XPS and XPS sputter depth profiling (FIG. 4a, grey curve), taken together, show the S 2p spectra of the catalyst after reaction. These indicate that sulphur is present at the core of the nanoparticle. FIG. 4b shows the Cu $L_3$-edge soft X-ray absorption spectra (sXAS) of the catalyst and corresponding reference standard materials. The results show that the V—$Cu_2S$ exhibits $Cu_2S$ features before reaction and both $Cu^0$ and $Cu^+$ features after reaction (derived $Cu_2S$/Cu—V). By simulating the EXAFS fitting of Cu K-edge in reduced space, the study found that the Cu—Cu bond distance of the CSVE catalyst becomes larger compared to the case of pure copper. Energy dispersive X-ray spectroscopy (EDX) results show that the sulphur concentration decreased after $CO_2$ reduction reaction for 16 hours (FIG. 4c). The atomic ratios of Cu:S in the catalyst before (Cu/S=1.94±0.01) and after (Cu/S=4.81±0.02) reaction were obtained using X-ray fluorescence (XRF, FIG. 4d).

Positron annihilation spectroscopy (PAS), which probes the type and relative concentration of defect vacancies, was carried out to investigate the copper surface. The positron lifetime spectra (FIG. 4e) and the lifetime parameters (see Table 3) show that both the CSVE catalyst and also the $Cu_2S$ bulk control, exhibit three lifetimes. The study assigns the shortest lifetime $\tau_1$ (around 260 ps) to the bulk and the longest component ($\tau_3$>2 ns) to the annihilation of orthopositronium atoms formed in the large voids present in the material. The study ascribes the component $\tau_2$ (circa 380 ps) to positron annihilation in trapped Cu vacancies. The relative intensities (I) of these lifetimes reflect that copper vacancies and bulk character are predominant in the CSVE nanoparticles and bulk $Cu_2S$, respectively. Simulated results in FIGS. 4f and 4g reveal the projection of the positron density distribution for the pure $Cu_2S$ bulk and the CSVE nanoparticle sample, indicating the high vacancy-associated concentration in the latter.

TABLE 3

| Sample | $T_1$ (ps) | $T_2$ (ps) | $T_3$ (ns) | $I_1$ (%) | $I_2$ (%) | $I_3$ (%) |
| --- | --- | --- | --- | --- | --- | --- |
| V-$Cu_2S$-derived nanoparticles | 264.0 | 373.0 | 2.98 | 43.8 | 55.1 | 1.11 |
| $Cu_2S$ Bulk | 259.3 | 381.0 | 6.90 | 67.8 | 32.2 | 0.03 |

Example 4: Performance in Electrochemical $CO_2$ Reduction

Figure 5:
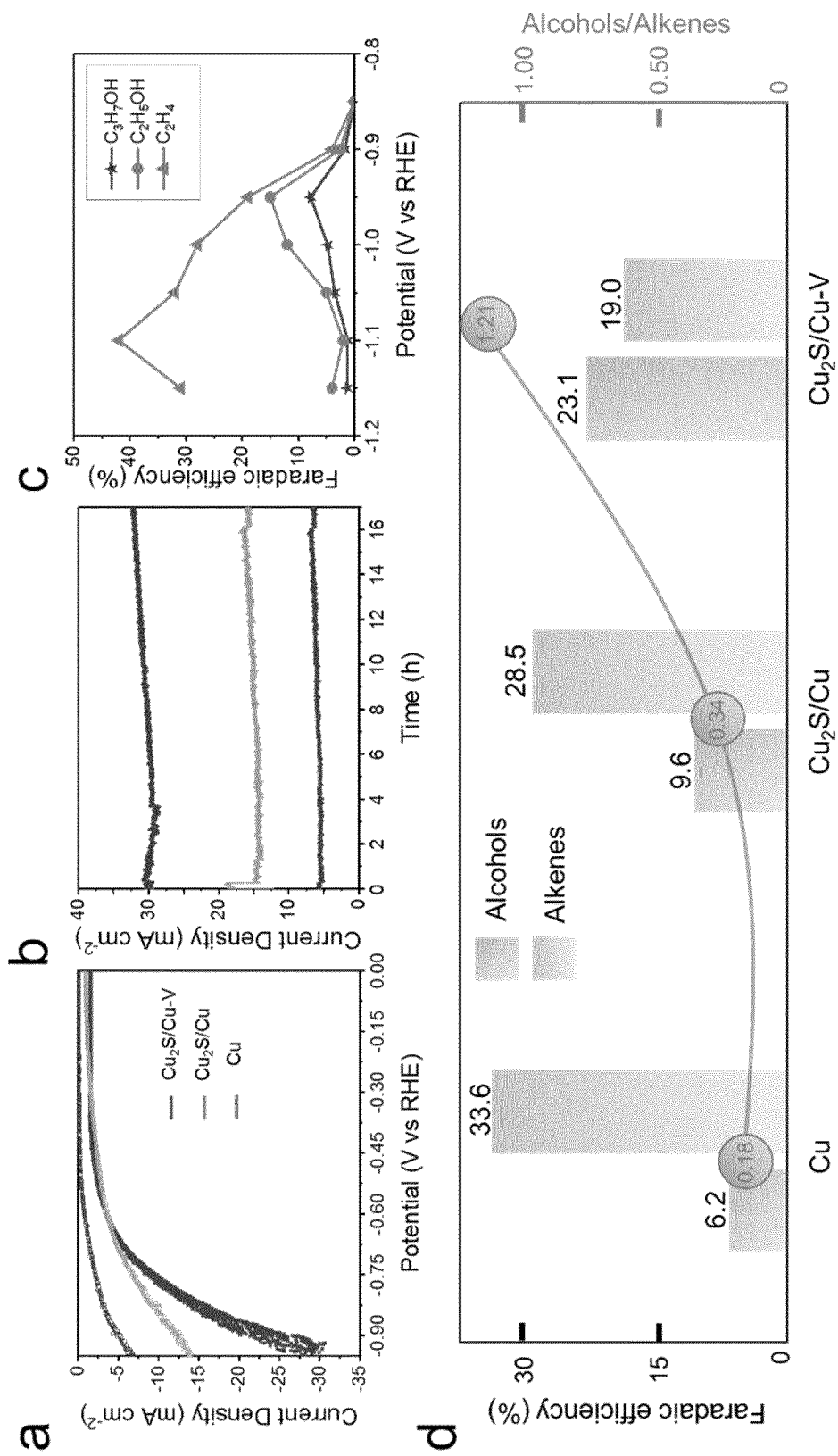
FIG. 5 illustrates the CO$_2$ electrochemical reduction performance in an H-cell system. (a) Linear sweep voltammetry curves in a CO$_2$-saturated 0.1 M KHCO$_3$ aqueous solution for the CVSE and control catalysts. (b) Chrono-amperometry results at a potential of −0.95 V vs RHE. (c) Faradaic efficiencies (FE) of alkenes and alcohols on CSVE nanocatalyst at different applied potentials. (d) Faradic efficiency of alcohols (ethanol and propanol) and ethylene on different catalysts at the potential of −0.95 V vs RHE. Inside circles show the corresponding faradic efficiency ratio of alcohols to alkenes.

To probe electrocatalytic properties, the electrochemical $CO_2$ reduction activity and selectivity was first characterized using a three-electrode H-cell system. The catalysts were loaded onto a glassy carbon electrode. Linear sweep voltammetry curves were obtained in a $CO_2$-saturated 0.1 M $KHCO_3$ aqueous solution (FIG. 5a). The CSVE catalyst exhibits a total geometric current density of ~32 mA cm$^{-2}$ at −0.95 V versus a reversible hydrogen electrode (RHE) during 16 h of continuous electrocatalysis (FIG. 5b).

Electrocatalysis was performed using cathodic potentials in the range of −0.85 V to −1.15 V versus RHE (FIG. 5c). As the applied potential becomes more negative (−0.9 V versus RHE), multi-carbon products are observed, indicating that C—C coupling occurs beyond this potential (see below table 4)

To characterize the intrinsic catalytic activity, the study measured the electrochemically active surface area (ECSA) of each catalyst. While the $Cu_2S$/Cu—V nanoparticles had a slightly larger ECSA than the $Cu_2S$ and Cu control nanoparticles, the ECSA difference between the CSVE and control catalysts is less than 4%. The shift in the C2 production pathway and the high current density towards alcohols is therefore ascribed to the catalyst itself rather than to any substantive increase in electrochemically active surface area.

It was then sought to engineer the reaction environment to work in tandem with the CSVE catalyst to suppress ethylene and boost multi-carbon alcohol production. At a high pH, the concentration of OH$^-$ will be increased proximate to the catalyst surface affecting the bound O* intermediate along

TABLE 4

| Potential (V vs RHE) | Hydrogen (FE, %) | Methane (FE, %) | Carbon-monoxide (FE, %) | Formate (FE, %) | Ethylene (FE, %) | Acetate (FE, %) | Acetaldehyde (FE, %) | Ethylene glycol (FE, %) | Ethanol (FE, %) | Allyl alcohol (FE, %) | Propionaldehyde (FE, %) | Propanol (FE, %) | Total (FE, %) |
|---|---|---|---|---|---|---|---|---|---|---|---|---|---|
| −0.85 | 15.8 ± 2 | 0 | 16.5 ± 1 | 66.0 ± 3 | 0 | 0 | 0 | 0 | 0 | 0 | 0 | 0 | ~98.3 |
| −0.90 | 16.8 ± 2 | 0.4 ± 0.1 | 10.5 ± 1 | 61.0 ± 2 | 4.0 ± 0.5 | 0.5 ± 0.1 | 0 | 0 | 2.5 ± 0.2 | 0 | 0 | 1.7 ± 0.1 | ~96.9 |
| −0.95 | 13.8 ± 1 | 0.3 ± 0.1 | 3.5 ± 0.3 | 30.8 ± 2 | 19.0 ± 2 | 0.5 ± 0.1 | 0.4 ± 0.1 | 1.9 ± 0.1 | 15.1 ± 1.5 | 3.0 ± 0.3 | 2.9 ± 0.2 | 8.0 ± 0.7 | ~99.2 |
| −1.00 | 18.5 ± 2 | 0.3 ± 0.1 | 1.5 ± 0.1 | 29.0 ± 1 | 28.1 ± 1 | 0.5 ± 0.1 | 0 | 1.3 ± 0.1 | 12.0 ± 1 | 1.6 ± 0.1 | 0.2 ± 0.1 | 4.8 ± 0.4 | ~97.8 |
| −1.05 | 29.8 ± 3 | 2.1 ± 0.2 | 0.5 ± 0.1 | 17.7 ± 1 | 32.2 ± 1 | 0.2 ± 0.1 | 0 | 1.2 ± 0.1 | 5.1 ± 0.5 | 0.2 ± 0.1 | 0 | 3.5 ± 0.3 | ~92.5 |
| −1.10 | 35.5 ± 3 | 2.4 ± 0.2 | 0 | 17.0 ± 1 | 42.3 ± 2 | 0.2 ± 0.1 | 0 | 0.6 ± 0.1 | 2.4 ± 0.2 | 0 | 0 | 1.2 ± 0.1 | ~101.6 |
| −1.15 | 41.8 ± 4 | 1.8 ± 0.1 | 0 | 4.2 ± 0.2 | 31.0 ± 1 | 0.3 ± 0.1 | 0 | 0.7 ± 0.1 | 4.0 ± 0.4 | 0 | 0 | 1.3 ± 0.1 | ~85.1 |

At potentials of −0.95 V vs RHE, 500 mV above the potential at which C—C coupling is first observed, the CSVE nanocatalyst shows peak alcohol production. Interestingly, propanol ($C_3H_7OH$) and ethanol ($C_2H_5OH$) follow a similar selectivity trend with changes to the applied potential, indicating that ethanol and propanol share common intermediates along their reaction pathways. This is consistent with the assumption made in the DFT part of the study, wherein the study used ethanol as a proxy for overall alcohol electrosynthesis. The maximum faradic efficiency for $C_3HOH$ and $C_2H_5OH$ reaches 8±0.7% and 15±1% with a partial current density of 2.5±0.1 and 4.8±0.1 mA cm$^{-2}$ at −0.95 V versus RHE, respectively (FIG. 5d).

These represent 6 times, 19 times, 46 times, and 44 times improvements in partial current density for C2+ alcohols compared with those of $Cu_2S$ NPs without vacancy, pure Cu NPs, bulk $Cu_2S$ and bulk Cu under the same operating conditions.

Figure 2:
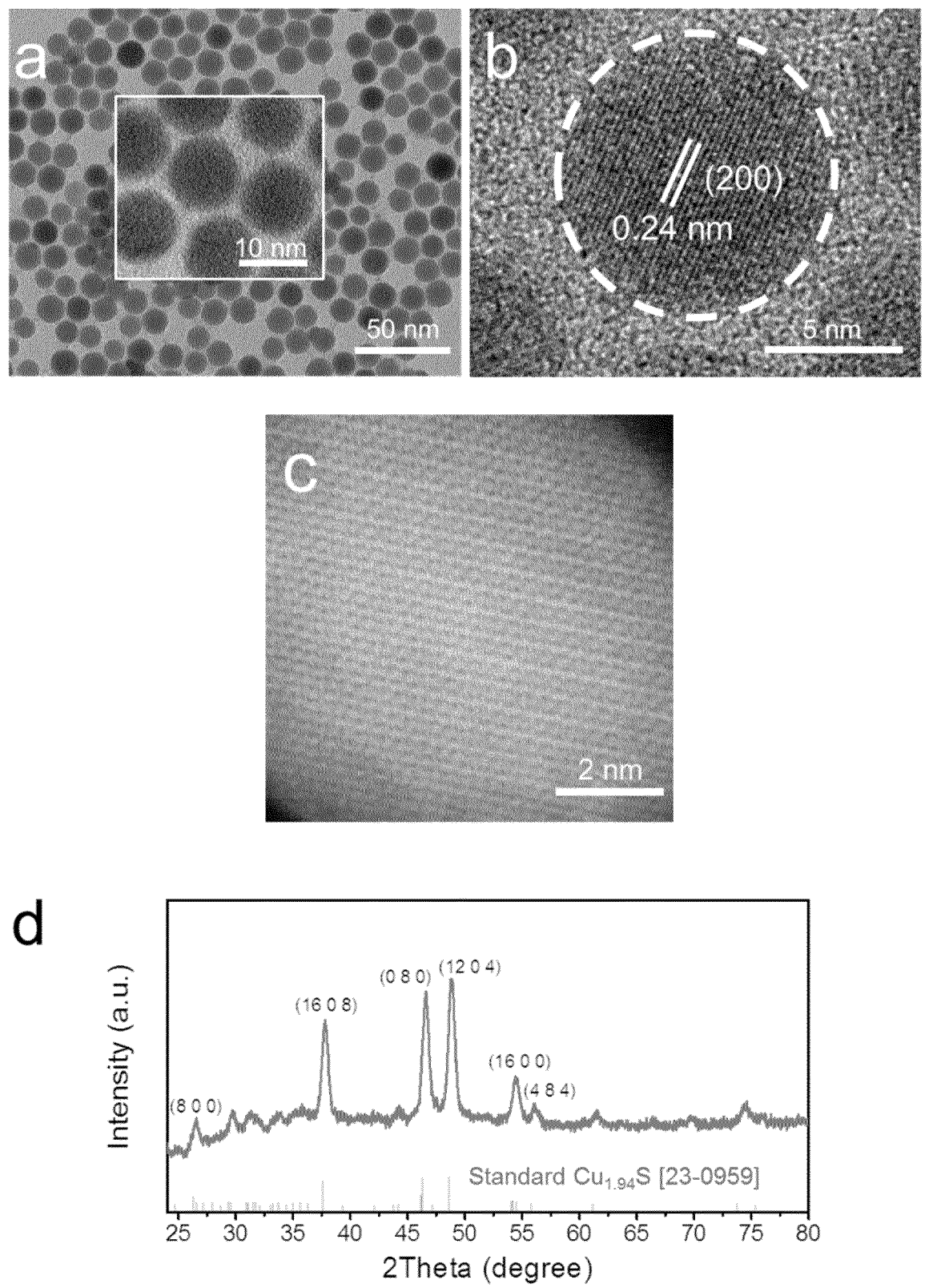
FIG. 2 (a-c) TEM, HRTEM and HAADF-STEM images of synthesized V—Cu$_2$S nanoparticles. (d) XRD pattern of obtained nanostructures. Lower grey lines are standard JCPDS data of monoclinic Cu$_{1.94}$S [23-0959], revealing the synthesized copper sulphide has copper deficiencies.

Moreover, the alcohol-to-ethylene ratio is enhanced from 0.18 on the bare-Cu NPs to 1.2, a 6 times increase with the CVSE catalyst, while overall C2+ selectivity remains similar (Table 5). It indicates that faradaic current was shifted from producing ethylene to producing alcohols.

the ethylene pathway (Reaction 2), but is expected to leave the ethanol pathway largely unaffected. The study turned to a flow-cell configuration that allowed operating in alkaline KOH electrolyte without compromising $CO_2$ availability. The study chose highly alkaline KOH as the electrolyte to increase the pH and electrolyte conductivity, and further enhance $CO_2$ reduction reaction kinetics by suppressing hydrogen evolution. The configuration bypasses the low $CO_2$ solubility in KOH via the diffusion of $CO_2$ across a gas-liquid interface adjacent to the catalyst surface (FIG. 2a). The catalyst was first deposited by spray-coating a nanoparticle ink onto a carbon gas-diffusion electrode (see details below).

Figure 6:
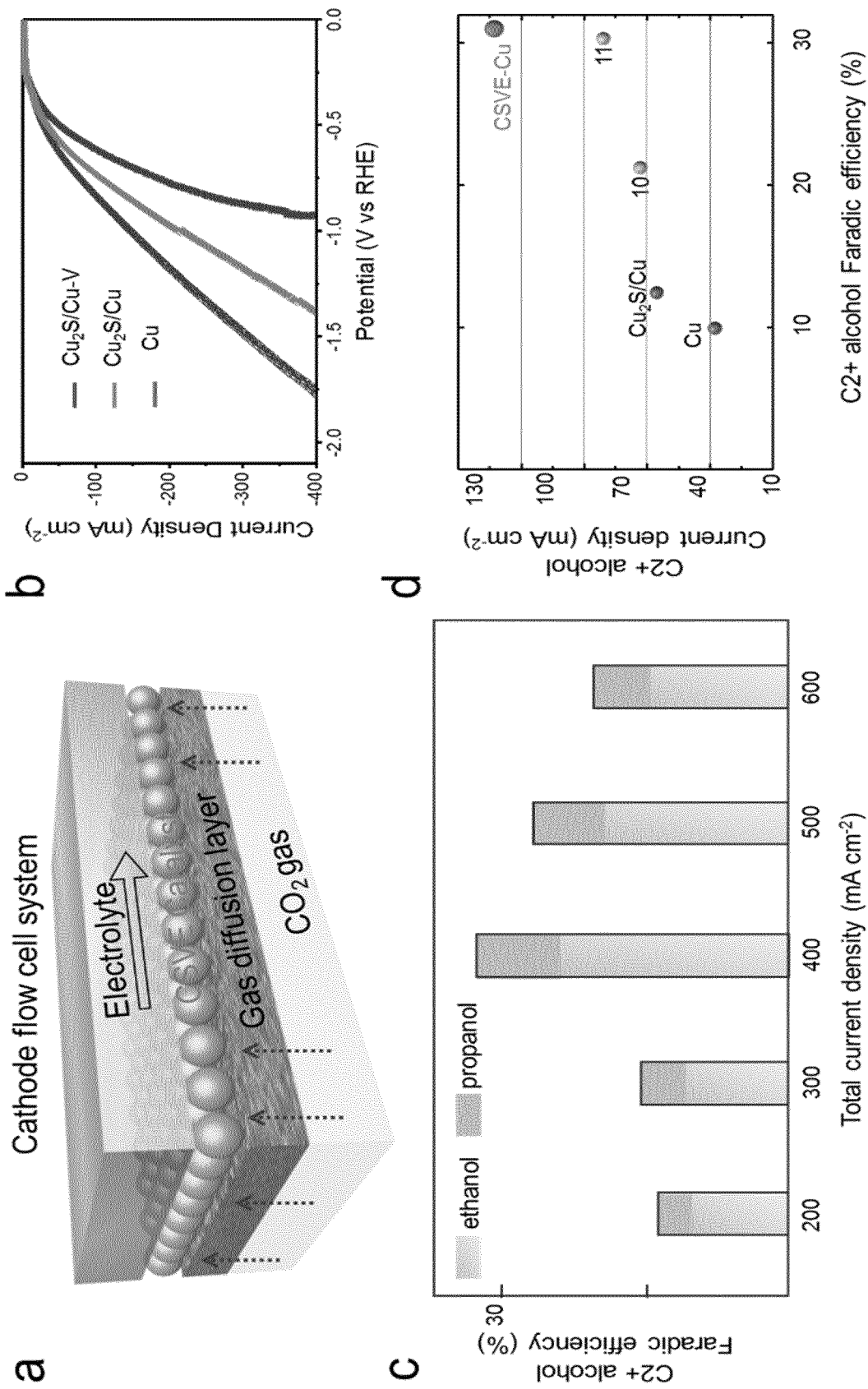
FIG. 6. CO$_2$ electrochemical reduction performance in a flow-cell system. (a) Schematic illustration of the cathode flow-cell system using a gas-diffusion electrode for CO$_2$. (b) Linear sweep voltammetry curves in the 1 M KOH electrolyte for the CVSE and control catalysts. (c) Faradaic efficiencies (FE) of C2+ alcohols (ethanol and propanol) on CSVE nanocatalyst in the current density range of 200-600 mA cm$^{-2}$. (d) Plot of C2+ alcohol partial current density versus maximum C2+ alcohol Faradaic efficiency for catalysts in a flow-cell system, references (10, 11).

Linear sweep voltammetry curves (FIG. 6b) of the three catalysts show the lower overpotentials of the CSVE-Cu catalyst at fixed current densities highlighting the improved activity.

Figure 7:
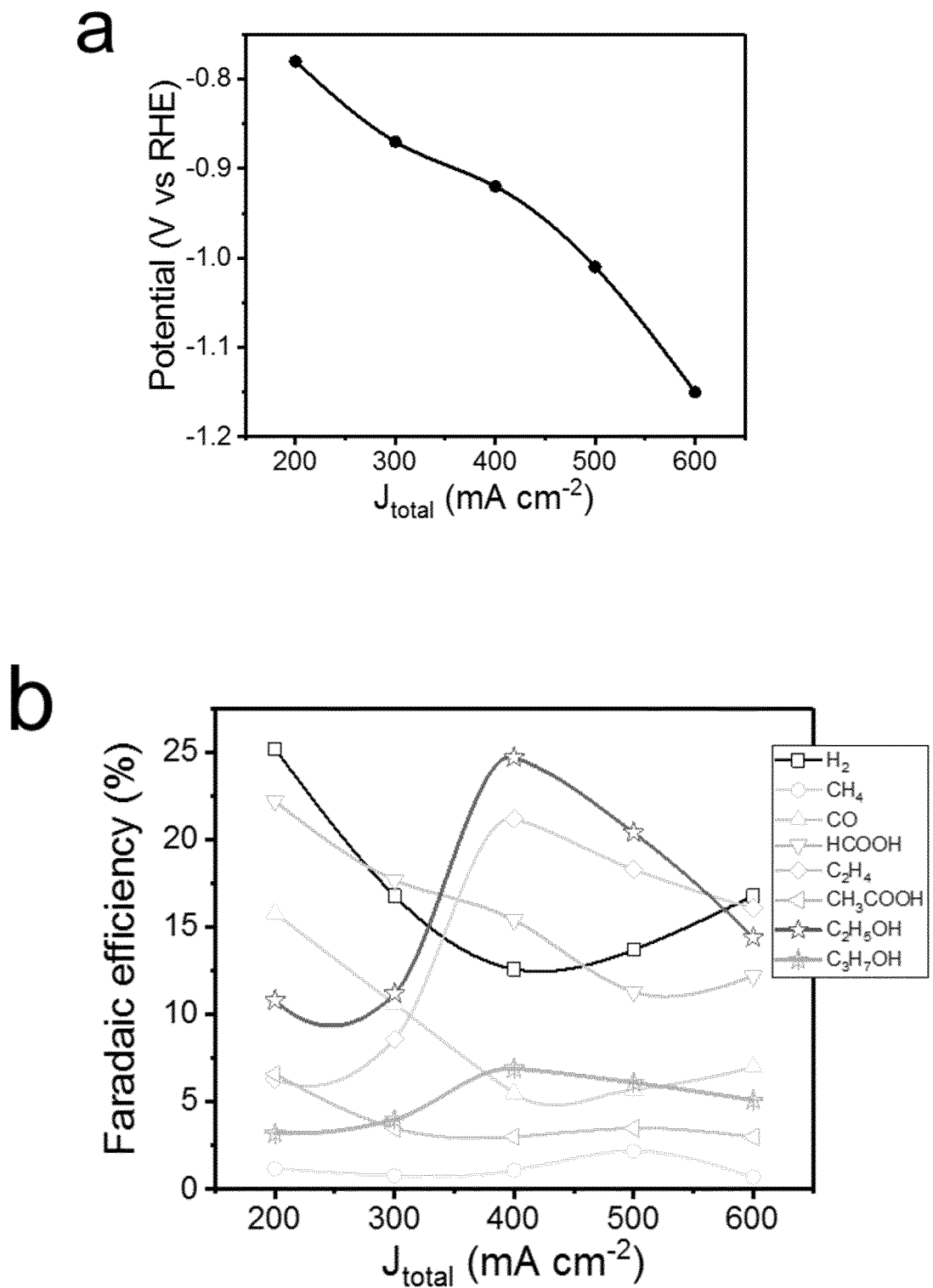
FIG. 7. (a) The potential versus the corresponding applied total current density using CSVE catalyst for CO$_2$ reduction in 1 M KOH electrolyte in Flow-cell system. (b) Faradaic efficiency of products distribution in 1 M KOH electrolyte at different applied total current densities. (c) Faradic efficiency over reaction time for ethanol and propanol in 1 M KOH electrolyte at an applied total current density of 400 mA cm$^{-2}$ and a potential of −0.92 V vs RHE. (d) Faradaic efficiencies of ethanol, propanol, and ethylene with different KOH concentration at an applied total current density of 400 mA cm$^{-2}$ and a potential of −0.92 V vs RHE.
Figure 7:
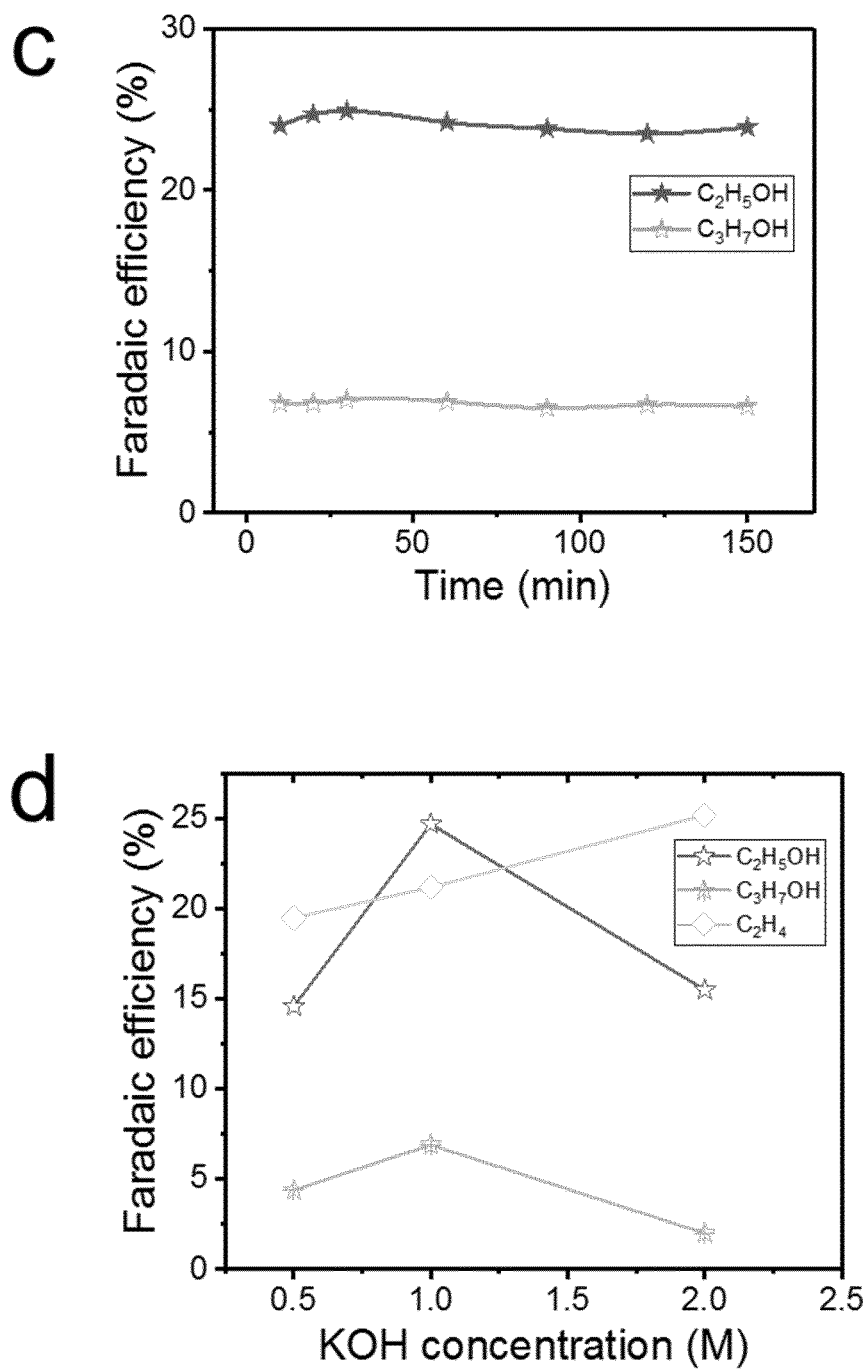

The study then evaluated the $CO_2$ reduction reaction activity in the current density range 200-600 mA cm$^{-2}$ in 1 M KOH (FIG. 6c, FIG. 7 and Table 6), a range facilitated by the use of a flow cell and the alkaline electrolyte. For the CSVE-Cu catalyst, the study achieved a Faradaic efficiency of 31% for multi-carbon alcohols ($C_2H_5OH$ 25±1% and $C_3H_7OH$ 7±0.5%). The partial current density exceeded 120 mA cm$^{-2}$ for multi-carbon alcohols.

TABLE 5

|  | Nano V-$Cu_2S$ | Nano $Cu_2S$ | Nano Cu | Bulk $Cu_2S$ | Bulk CuS | Bulk Cu |
|---|---|---|---|---|---|---|
| $C_2H_4$ (FE, %) | 19.0 ± 2 | 28.5 ± 1 | 33.6 ± 2 | 3.0 ± 0.2 | 1.9 ± 0.2 | 16.5 ± 0.5 |
| $C_2H_5OH$ (FE, %) | 15.1 ± 1.5 | 5.8 ± 0.5 | 4.3 ± 0.4 | 2.5 ± 0.2 | 0.5 ± 0.1 | 3.3 ± 0.3 |
| $C_3H_7OH$ (FE, %) | 8.0 ± 0.7 | 3.8 ± 0.3 | 1.9 ± 0.1 | 1.9 ± 0.1 | 0 | 0.7 ± 0.1 |

TABLE 6

| Applied current density | Hydrogen (FE, %) | Methane (FE, %) | Carbon monoxide (FE, %) | Formate (FE, %) | Ethylene (FE, %) | Acetate (FE, %) | Ethanol (FE, %) | Propanol (FE, %) | Total (FE, %) |
|---|---|---|---|---|---|---|---|---|---|
| 200 | 25.2 ± 2 | 1.2 ± 0.1 | 15.8 ± 1 | 22.2 ± 2 | 6.3 ± 0.5 | 6.6 ± 0.5 | 10.8 ± 1 | 3.2 ± 0.2 | ~91.3 |
| 300 | 16.8 ± 1 | 0.8 ± 0.1 | 10.6 ± 1 | 17.7 ± 1 | 8.6 ± 0.5 | 3.5 ± 0.2 | 11.2 ± 1 | 4.0 ± 0.3 | ~73.2 |
| 400 | 12.6 ± 1 | 1.1 ± 0.1 | 5.5 ± 0.5 | 15.4 ± 1 | 21.2 ± 2 | 3.0 ± 0.2 | 24.7 ± 2 | 6.9 ± 0.5 | ~90.4 |
| 500 | 13.7 ± 1 | 2.2 ± 0.2 | 5.7 ± 0.5 | 11.3 ± 1 | 18.3 ± 1 | 3.5 ± 0.2 | 20.4 ± 2 | 6.1 ± 0.5 | ~81.2 |
| 600 | 16.8 ± 1 | 0.7 ± 0.1 | 7.0 ± 0.5 | 12.2 ± 1 | 16.1 ± 1 | 3.0 ± 0.2 | 14.4 ± 1 | 5.1 ± 0.5 | ~75.3 |

Figure 8:
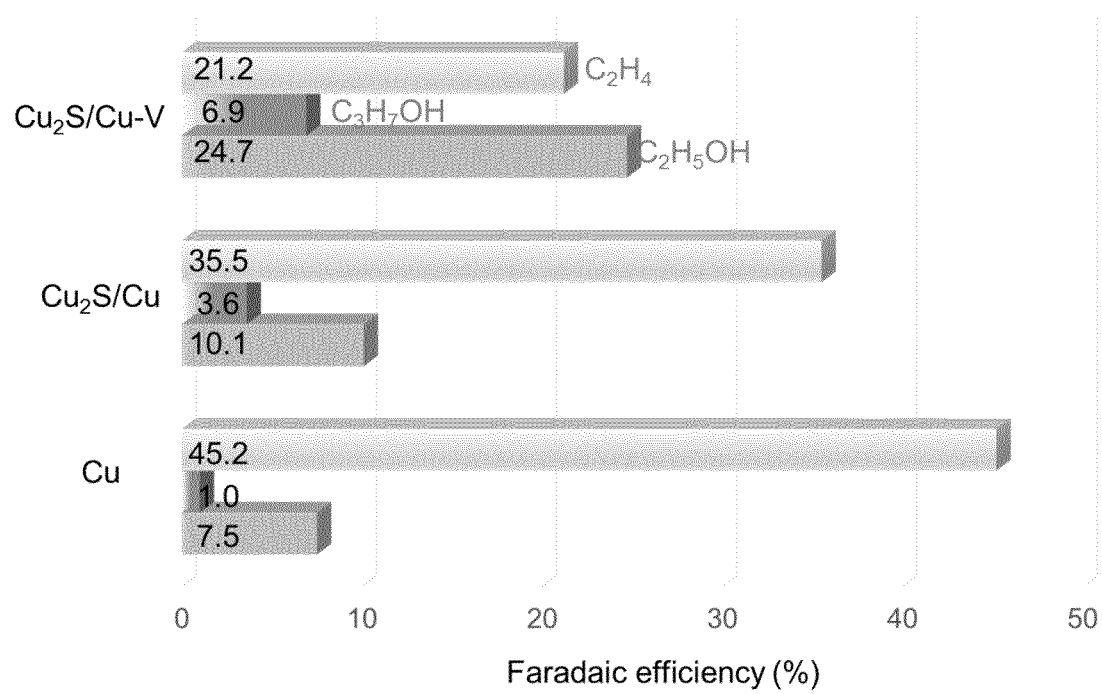
FIG. 8. Faradaic efficiencies of ethanol, propanol, and ethylene on different catalysts measured in 1 M KOH electrolyte at an applied potential of −0.92 V vs RHE in the flow-cell system.
Figure 9:
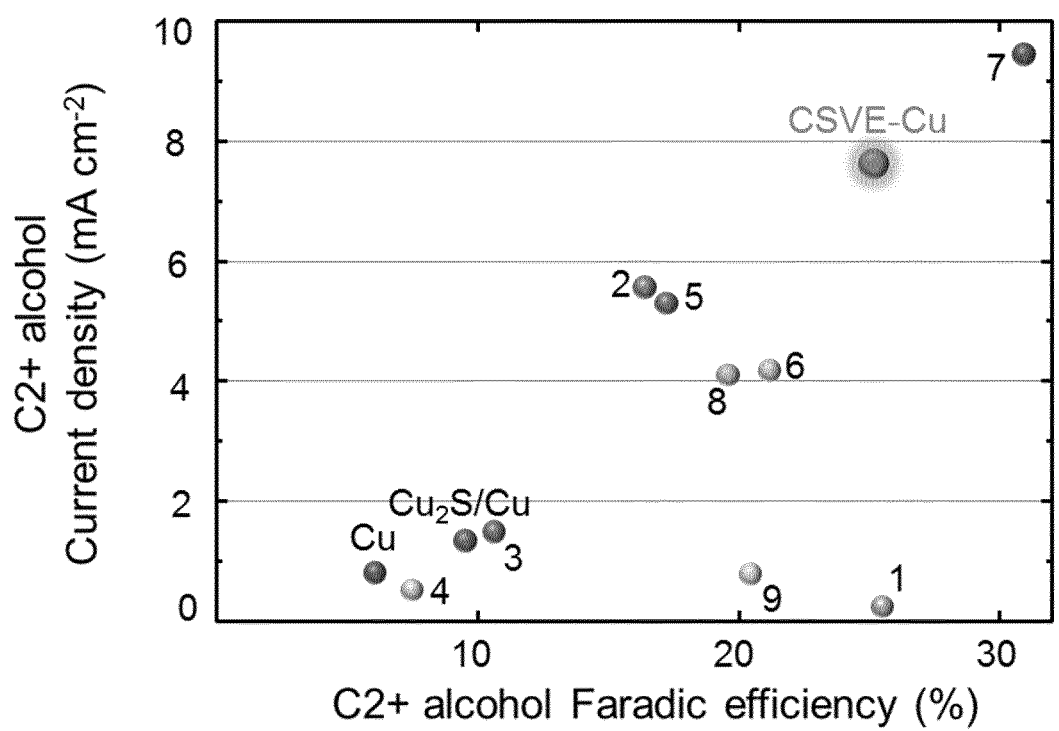
FIG. 9. The plot of C2+ alcohol partial current density versus maximum C2+ alcohol Faradaic efficiency for catalysts in H-cell system, references (1-9).

The faradic efficiency and partial current density exceeded, by a factor of 2, those of control catalysts, including both $Cu_2S$ without vacancy, and also pure Cu (FIG. 8). The C2+ alcohol partial current density versus maximum C2+ alcohol Faradaic efficiency for a range of catalysts reported in the literature is provided in FIG. 6d, FIG. 9 and Table 7.

TABLE 7

| Sample | FE/alcohols (ethanol + propanol, %) | J/alcohols (ethanol + propanol) (mA cm$^{-2}$) | Reference |
|---|---|---|---|
| 1. Cu—Pt | 25 | 0.146 | Green Chem. 18, 3216, 2016[19] |
| 2. Polished $Cu_2O$ | 16.3 | 5.7 | ACS Catal. 5, 2814, 2015[20] |
| 3. $Cu_2O$-derived | 10.4 | 1.55 | J. Am. Chem. Soc. 134, 7231, 2012[21] |
| 4. Cu nanocubes | 7.8 | 0.2 | Angew. Chem. Int. Ed. 55, 5789, 2016[22] |
| 5. $Cu_2O$-derived | 17.2 | 5.4 | J. Phy. Chem. C 120, 20058, 2016[23] |
| 6. Cu nanocrystals | 21.4 | 4.2 | J. Phy. Chem. lett. 7, 20, 2016[24] |
| 7. $CuZn_x$ | 33.5 | 9.4 | ACS Cata. 6, 8239, 2016[25] |
| 8. Cu nanoparticles | 19.9 | 4.1 | PNAS 114, 10560, 2017[26] |
| 9. Cu(100) | 21.9 | 0.8 | PNAS 114, 5918, 2017[27] |
| Cu in H-cell | 6.2 | 0.4 | This work |
| $Cu_2S$/Cu in H-cell | 9.6 | 1.3 | This work |
| CSVE-Cu in H-cell | 23.1 | 7.3 | This work |
| 10. Cu nanoparticles | 21.9 | 65 | J. Power Sources 301, 219, 2016[28] |
| 11. Cu-DAT wires | 30.8 | 81.2 | ACS Cata. 7, 3313, 2017[29] |
| Cu in Flow-cell | 8.5 | 34 | This work |
| $Cu_2S$/Cu in Flow cell | 13.7 | 54.8 | This work |
| CSVE-Cu in Flow-cell | 31.6 | 126 | This work |

The prior works results indicated in this table are from the below articles:

Yang, H.-P., Yue, Y.-N., Qin, S., Wang, H. & Lu, J.-X. Selective electrochemical reduction of $CO_2$ to different alcohol products by an organically doped alloy catalyst. Green Chem. 18, 3216-3220 (2016).

Ren, D. et al. Selective electrochemical reduction of carbon dioxide to ethylene and ethanol on copper (I) oxide catalysts. ACS Catal. 5, 2814-2821 (2015).

Li, C. W. & Kanan, M. W. $CO_2$ Reduction at Low Overpotential on Cu Electrodes Resulting from the Reduction of Thick $Cu_2O$ Films. J. Am. Chem. Soc. 134, 7231-7234 (2012).

Loiudice, A. et al. Tailoring Copper Nanocrystals towards C2 Products in Electrochemical $CO_2$ Reduction. Angew. Chem. Int. Ed. 55, 5789-5792 (2016).

Handoko, A. D. et al. Mechanistic Insights into the Selective Electroreduction of Carbon Dioxide to Ethylene on $Cu_2O$-Derived Copper Catalysts. J. Phy. Chem. C 120, 20058-20067 (2016).

Ren, D., Wong, N. T., Handoko, A. D., Huang, Y. & Yeo, B. S. Mechanistic Insights into the Enhanced Activity and Stability of Agglomerated Cu Nanocrystals for the Electrochemical Reduction of Carbon Dioxide to n-Propanol. J. Phys. Chem. Lett. 7, 20-24 (2016).

Ren, D., Ang, B. S.-H. & Yeo, B. S. Tuning the Selectivity of Carbon Dioxide Electroreduction toward Ethanol on Oxide-Derived $Cu_xZn$ Catalysts. ACS Catal. 6, 8239-8247 (2016).

Kim, D., Kley, C. S., Li, Y. & Yang, P. Copper nanoparticle ensembles for selective electroreduction of $CO_2$ to C2-C3 products. PNAS 114, 10560-10565 (2017).

Hahn, C. et al. Engineering Cu surfaces for the electrocatalytic conversion of $CO_2$: Controlling selectivity toward oxygenates and hydrocarbons. PNAS 114, 5918-5923 (2017).

Ma, S. et al. One-step electrosynthesis of ethylene and ethanol from $CO_2$ in an alkaline electrolyzer. J. Power Sources 301, 219-228 (2016).

Hoang, T. T. H., Ma, S., Gold, J. I., Kenis, P. J. A. & Gewirth, A. A. Nanoporous Copper Films by Additive-Controlled Electrodeposition: $CO_2$ Reduction Catalysis. ACS Catal. 7, 3313-3321 (2017).

The invention claimed is:

1. A catalyst system for electrocatalyzing conversion of $CO_2$ into multi-carbon hydrocarbons and/or alcohols, characterised in that the catalyst system comprises a core-shell structure comprising a core that is composed of a metal sulphide and a shell having a lower sulphur content than the core and that is composed of a metal with vacancies; in that the metal of the core and the metal of the shell are the same metal; and in that the shell has a thickness that is ranging between 1 nm to 3 nm as determined by EDS line scan measurement, wherein EDS line scan is carried out using a JEM-ARM 200F Atomic Resolution Analytical Microscope operating at an accelerating voltage of 200 kV.

2. The catalyst system of claim 1, characterised in that the metal of the core and the metal of the shell are copper.

3. The catalyst system of claim 1, characterised in that the core-shell structure is core-shell particles.

4. The catalyst system of claim 1, characterised in that the catalyst system comprises copper and sulphur, and in that copper and sulphur are distributed evenly throughout the core and/or copper and sulphur are present in a non-stoichiometric ratio.

5. The catalyst system of claim 1, characterised in that the core of the core-shell particles comprises or consists of a djurleite phase; and/or the core of the core-shell particles has a covellite structure.

6. The catalyst system of claim 1, characterised in that the core and shell have an overall Cu/S molar ratio ranging between 3 and 7 as determined by XRF-1800 quantitative analysis with a 4 kW Thin-window X-ray Tube.

7. The catalyst system of claim 1, characterised in that the shell has a thickness that is ranging between 1.5 nm to 2.5 nm as determined by EDS line scan measurement, wherein EDS line scan is carried out using a JEM-ARM 200F Atomic Resolution Analytical Microscope operating at an accelerating voltage of 200 kV.

8. The catalyst system of claim 1, characterised in that the shell has a thickness that is smaller than a diameter of the core.

9. The catalyst system of claim 1, characterised in that the core-shell structure is core-shell layered material comprising an inner layer forming a core and an outer layer forming a shell.

10. A method for electrochemical production of a multi-carbon alcohol, characterized in that the method comprises the steps of:
    contacting $CO_2$ gas and an electrolyte with an electrode comprising the catalyst system as defined in claim 1, such that the $CO_2$ contacts a catalyst layer comprising the catalyst system;
    applying a voltage to provide a current density to cause the $CO_2$ gas contacting the catalyst layer to be electrochemically converted into the multi-carbon alcohol; and
    recovering the multi-carbon alcohol.

11. The method of claim 10, characterised in that the recovered multi-carbon alcohol comprises ethanol and/or propanol and/or in that the electrolyte comprises an alkaline potassium compound.

12. The method of claim 10, characterised in that the method further comprises a step of deploying a catalyst system precursor comprising copper sulphide particles in the electrolyte and applying the voltage to:
    initiate the electrochemical production of the multi-carbon alcohol; and
    subject an external layer of the copper sulphide particles to reduction to remove sulphur therefrom and thereby form the shell of the catalyst system.

13. The method of claim 10, characterised in that the voltage applied is ranging from 300 to 700 mV at potentials of −0.95 V vs RHE.

14. A method of manufacturing a catalyst system comprising core-shell particles for electrocatalyzing conversion of $CO_2$ into multi-carbon hydrocarbons and/or alcohols, characterised in that the method comprises the following steps:
    preparing particles that comprise vacancy enriched metal sulphide;
    subjecting the particles to reduction to produce a reduced metallic shell with enriched vacancies surrounding a metal sulphide core, thereby forming the core-shell particle; and in that the catalyst system is according to claim 1.

15. The method of claim 14, characterised in that the particles that are prepared are nanoparticles.

16. The method of claim 14 characterised in that the particles are prepared using a solvothermal method.

17. The method of claim 14, characterised in that the reduction of the particles comprises electroreduction by contacting the particles with $CO_2$ saturated electrolyte and applying a voltage to provide a current density to cause $CO_2$ gas contacting the particles to be electrochemically converted into the multi-carbon hydrocarbon.

18. The method of claim 17, characterised in that the electroreduction is performed in a two-compartment electrochemical H-cell with a proton exchange membrane as a separator and a flow-cell configuration comprising a gas-diffusion layer with an anion exchange membrane.

19. The method of claim 17, characterised in that the electroreduction is performed in an electroreduction unit that is subsequently used to produce the multi-carbon hydrocarbons such that the core-shell particles are formed in situ.

20. The method of claim 14, characterised in that the step of preparing of the particles comprises the following sub-steps:
    dissolving $Cu_{(acac)2}$ in a solvent to form a reaction mixture;
    heating the reaction mixture to form the particles; and
    collecting the particles from the reaction mixture.

* * * * *